US007243416B2

(12) United States Patent
Shioda

(10) Patent No.: US 7,243,416 B2
(45) Date of Patent: Jul. 17, 2007

(54) APPARATUS FOR PRESS-CONTACTING ELECTRIC WIRE, METHOD OF PRESS-CONTACTING THE SAME AND WIRE HARNESS MANUFACTURED BY THE METHOD

(75) Inventor: Ryousuke Shioda, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 441 days.

(21) Appl. No.: 10/806,133

(22) Filed: Mar. 23, 2004

(65) Prior Publication Data

US 2004/0187300 A1 Sep. 30, 2004

(30) Foreign Application Priority Data

Mar. 24, 2003 (JP) ............................ 2003-081173

(51) Int. Cl.
*B23P 19/00* (2006.01)

(52) U.S. Cl. ............................ 29/748; 29/749; 29/753; 29/755; 29/566.3; 29/861; 29/33 M; 72/712

(58) Field of Classification Search .......... 29/729–743, 29/745–753, 566.1, 566.4, 566.3, 33 M; 81/363, 373; 72/421, 712; 7/107
See application file for complete search history.

(56) References Cited

U.S. PATENT DOCUMENTS

| | | | | |
|---|---|---|---|---|
| 4,908,941 | A | 3/1990 | Fukuda et al. | |
| 4,965,923 | A * | 10/1990 | Kumazawa | 29/566.3 |
| 5,165,167 | A * | 11/1992 | Dechelette | 29/861 |
| 5,659,949 | A * | 8/1997 | Ohba et al. | 29/753 |
| 6,490,785 | B1 * | 12/2002 | Kometani | 29/742 |
| 6,931,719 | B2 * | 8/2005 | Itai et al. | 29/749 |
| 2002/0055295 | A1 | 5/2002 | Itai et al. | |

* cited by examiner

*Primary Examiner*—Minh Trinh
(74) *Attorney, Agent, or Firm*—Oliff & Berridge, PLC

(57) ABSTRACT

A structure of a press-contacting holding part is not complicated so that press-contacting operation of press-contacting an electric wire to the press-contacting terminal is easily and precisely performed. According to the invention, an apparatus of press-contacting of electric wire includes a case holding part for holding case provided with a press-contacting terminal, an electric wire holding part for holding the electric wire positioned by the positioning part, a press-contacting driving mechanism for driving the electric wire held by the electric wire holding part so that the electric wire is pushed into a slot part of the press-contacting terminal to provide pressure contact therebetween.

2 Claims, 19 Drawing Sheets

APPARATUS FOR PRESS-CONTACTING ELECTRIC WIRE, METHOD OF PRESS-CONTACTING THE SAME AND WIRE HARNESS MANUFACTURED BY THE METHOD

BACKGROUND OF THE INVENTION

1. Field of the Invention

The present invention relates to an apparatus for press-contacting an electric wire for pushing an electric wire into a slot part of a press-contacting terminal to pressure-contact.

2. Description of the Related Art

A pressure contact joint connector connecting apparatus is known as described in JP-A-2002-93544. In JP-A-2002-93544, The apparatus includes a pressure contact terminal for causing a plurality of electric wires to short circuit, a housing part for receiving the pressure contact terminal, and a pressure contact joint connector having a cover engaged with the housing. The apparatus is used for connecting the pressure contact joint connector to a wire harness on the wire harness plate. A pressure receiving table for receiving a housing portion of the pressure contact joint connector, an electric wire press-fitting part for press-fitting the electric wire attached to the housing part on the pressure receiving table to the pressure contact terminal attached to the housing part, a cover holder part for holding the cover part of the pressure contact joint connector in order to engage the cover part to the housing part after press-fitting are provided with a press unit for subjecting each connection element component to a press operation.

According to the apparatus of JP-A-2002-93544, an identical press unit in which an electric wire as a connection element component and a holding part of the cover member are provided can be used to perform the pressure contact operation of the electric wire and the fitting operation of the cover part in a continuous manner. However, in order to appropriately press-contact the electric wire into the slot part of the press-contacting terminal of the housing part without causing the electric wire to have displacement, it is required to hold the electric wire in the housing part while applying a predetermined tension to the electric wire and precisely positioning the electric wire. Moreover, in order to fit into the cover member with the housing part after the pressure-contact of the electric wire, the tension applied to the electric wire must be reduced in order to prevent a situation where the cover member is pushed to the above-mentioned electric wire to cause an excessive load. Thus, it has been difficult to satisfy such contrary requirements at the same time.

As described in JP-A-2002-93544, when a group of sandwiching pieces for temporarily holding the positioned electric wire is provided in the housing part so that the electric wire is temporarily held by the group of sandwiching pieces, the electric wire can pressure contact with the press-contacting terminal while the electric wire is being positioned in the housing part. Moreover, the electric wire restricted to the exterior part of the housing part can be released to prevent the electric wire from having an excessive load when the cover member is fitted. However, the requires the group of sandwiching pieces in which a large number of sandwiching pieces for temporarily holding the electric wire must be provided adjacent to the press-contacting terminal in the housing part. So, there is a problem that the housing part has a complicated structure and a larger size.

When the group of sandwiching pieces cannot be provided in the housing part, a holding part for holding the electric wire W while the electric wire is being positioned at the exterior part of the housing part must be provided. In the case, even when the electric wire can be pressure contacted into the slot part of the press-contacting terminal, the cover member is pushed to the electric wire held by the holding part to inevitably cause an excessive load when the cover member is fitted into the housing part.

SUMMARY OF THE INVENTION

It is an object of the present invention to provide with an apparatus for the press-contacting an electric wire that can provide an operation of the electric wire according to the press-contacting terminal in an easy and appropriate manner regardless of the type of structure of the press-contacting terminal storage part.

According to first aspect of the invention, there is provided with an apparatus for press-contacting an electric wire including: a case holding part for holding a case in which a press-contacting terminal is stored; a positioning part for positioning the electric wire in the vicinity of the case holding part to be opposed to the press-contacting terminal; an electric wire holding part for holding the electric wire positioned by the positioning part; a press-contacting driving mechanism for driving the electric wire held by the electric wire holding part so that the electric wire is pushed into a slot part of the press-contacting terminal to provide pressure contact therebetween; and a tension driving mechanism for driving the electric wire holding part in a direction along which the electric wire held by the electric wire holding part is tensioned.

According to the first aspect of the invention, when the electric wire held by the electric wire holding part is pushed into the slot part of the press-contacting terminal, the electric wire holding part is driven in a direction along which the electric wire held by the electric wire holding part has tension. As a result, an operation for pushing the electric wire into the slot part of the press-contacting terminal can be carried out in an easy and appropriate manner while the electric wire is being applied with appropriate tension to precisely position the electric wire.

It is preferable that the apparatus for press-contacting an electric wire may further includes an electric wire cutting part for cutting the electric wire between the case holding part and the electric wire holding part in response to the press-contacting operation by the press-contacting driving mechanism.

According to the structure, a press-contacting operation for press-contacting the electric wire with the pressure contact to the press-contacting terminal in a state where the electric wire held by the electric wire holding part is being applied with appropriate tension and an operation for cutting the electric wire can be continuously carried out in an appropriate manner.

According to the third aspect of the invention, the apparatus for press-contacting an electric wire further includes a cover holding part for holding a cover member that is fitted for covering the position at which the electric wire is provided in the case, a fitting driving mechanism for driving the cover member held by the cover holding part so that the cover member is fitted into the case, and a loosening driving mechanism for driving, in response to the operation for fitting the cover member, the electric wire holding part in a direction along which the electric wire is loosened, wherein the electric wire is pushed into a slot part of the press-contacting terminal to provide pressure contact therebetween, while the press-contacting terminal stored in the case is being positioned with the electric wire is held by the electric wire holding part.

According to the structure, when the cover member held by the cover holding part is fitted into the case, the electric wire holding part is driven in a direction along which the electric wire held by the electric wire holding part is loosened. The can effectively prevent an adverse effect such as one in which a strong pressure contact between the cover member and the electric wire causes the electric wire to have a significant load or the electric wire, and the electric wire is pulled out from the press-contacting terminal.

DESCRIPTION OF THE PREFERRED EMBODIMENTS

Figure 1:
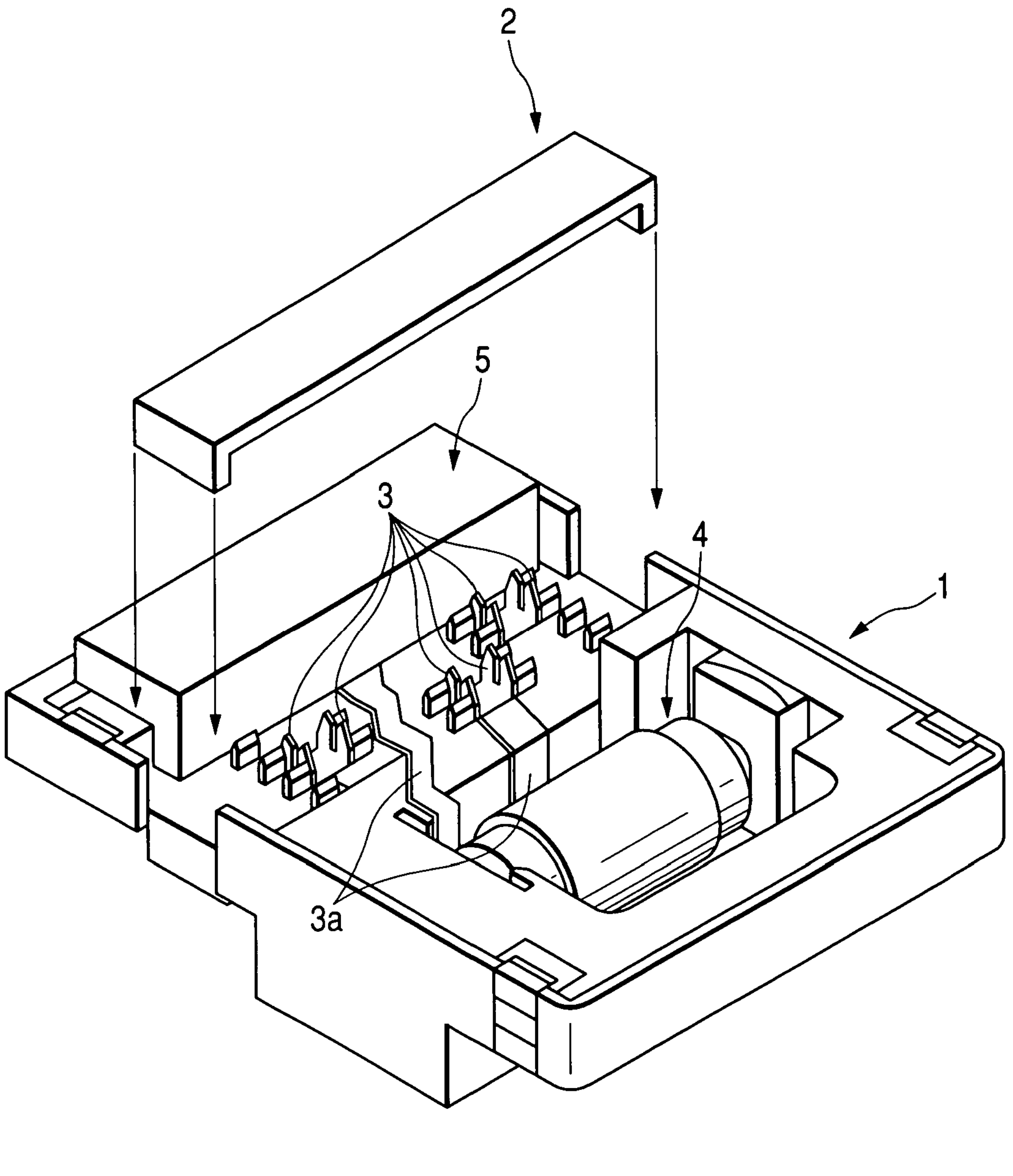
FIG. 1 is a perspective view illustrating a specific structure of a case and a terminal.

FIG. 1 shows a structure of a room lamp unit of a device for press-contacting with an electric wire by the apparatus of the press-contacting an electric wire according to the present invention. A wire harness may be provided with the device including the room lamp unit. The room lamp unit includes: a bus bar piece 3*a* having the press-contacting terminal 3; a resin-made case 1 having a lamp connected via the bus bar piece 3*a* and switch storage parts 4 and 5; and a cover member 2 for entirely covering the position at which the electric wire is provided that is connected to the press-contacting terminal 3 provided in a projected manner in the bus bar piece 3*a*.

The press-contacting terminal 3 has an electrically conductive member having a slot part to which the electric wire is pressed into contact. A pressure contact blade of the slot part cuts is pressed into the covering part of the electric wire in accordance with the press-contacting operation where the slot parts of a pair of press-contacting terminals 3 provided to be opposed to each other are pushed with the electric wires for press-contacting, so that the press-contacting terminal 3 is electrically connected to the electric wire.

Figure 2:
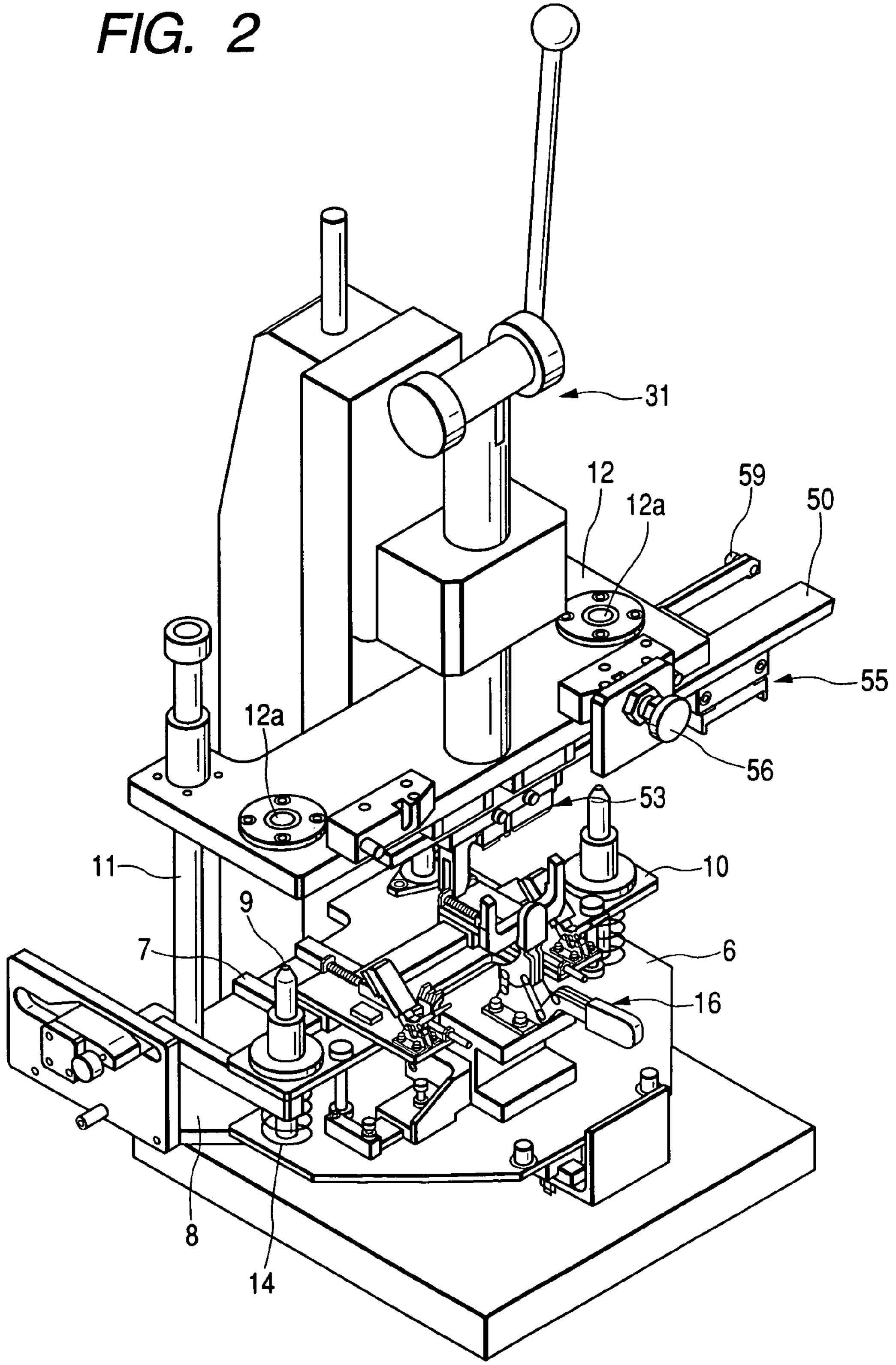
FIG. 2 is a perspective view illustrating an embodiment of an apparatus for press-contacting an electric wire according to the present invention.

FIG. 2 shows a whole structure of the apparatus according to an embodiment of the present invention.

The apparatus includes: the support table 6 for supporting in the state positioning at the case 1; the base plate 8 having at the upper face thereof the guide rail 7 for slidably supporting the support table 6; a pair of left and right support bars 9 at the support table 6; a floating plate 10 elevatably supported along the support bar 9; a pair of left and right elevation guide bars 11 provided at the back side part of the base plate 8; and a press-contacting driving mechanism 13 having a press-contacting head 12 elevatably supported along the elevation guide bar 11. The base end part of the support bar 9 is externally engaged with the biasing member 14 for biasing the floating plate 10 in an upward direction that includes a compression coil spring.

Figure 3:
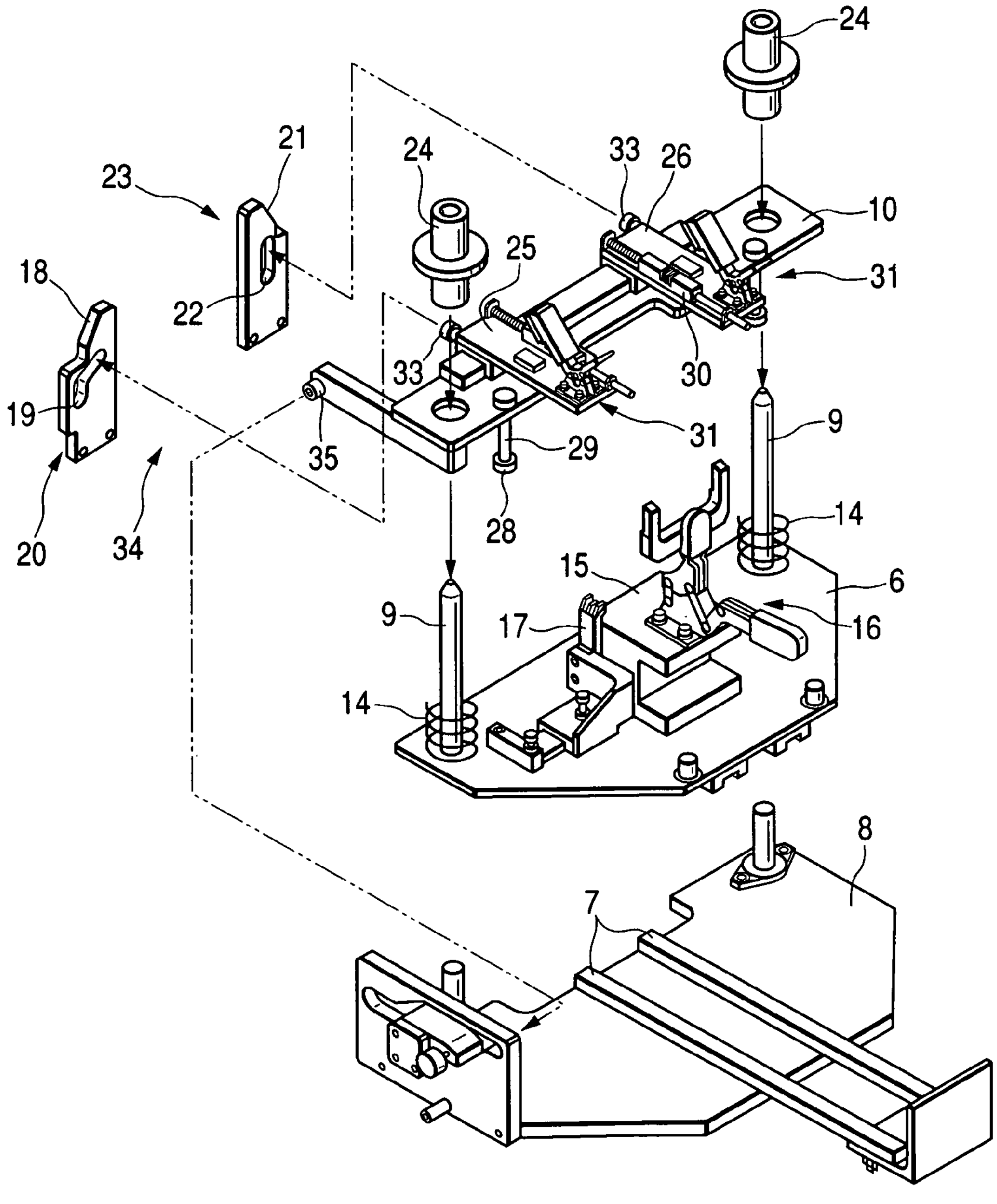
FIG. 3 is a perspective-view illustrating the structure of the main part of the apparatus for press-contacting an electric wire.
Figure 4A:
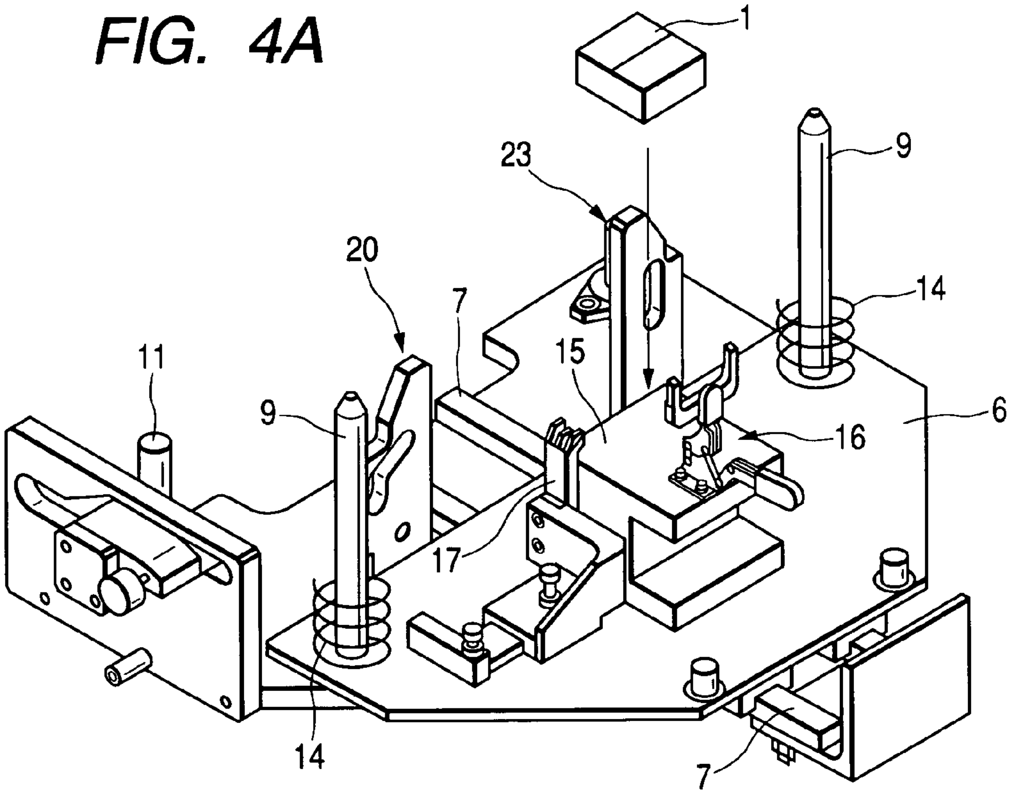
FIGS. 4A and 4B are perspective views illustrating the holding operation by the case.
Figure 4B:
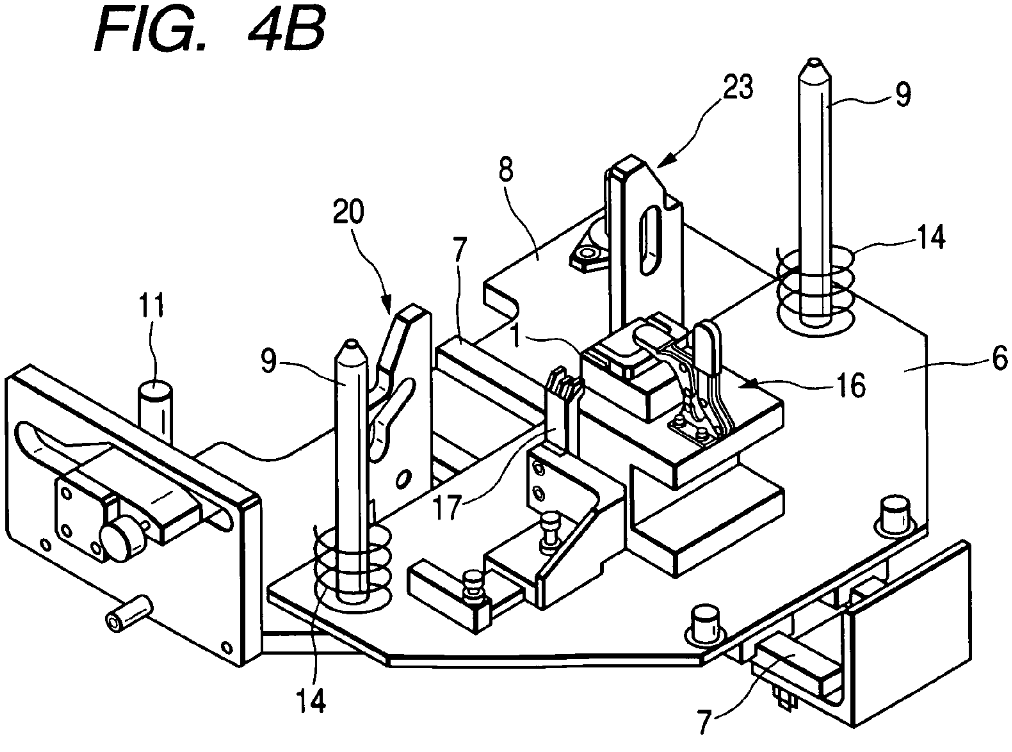

As shown in FIG. 3 to FIG. 5, the support table 6 includes: the case holding part 16 having a clamp mechanism in which the case 1 positioned on a plate 15 at the center part is held; and a lower cutting blade 17 provided at the side part for cutting the electric wire W. While the case 1 is placed on the plate 15, the clamp mechanism is swung to displace, from the no-clamp position shown in FIG. 4A to the clamp position shown in FIG. 4B. The case 1 can be detachably held at the substantial center part of the support table 6.

One side of the back face part of the support table 6 has a guide face 18 having a narrowed upper part provided at the outer periphery part of the upper part. The one side of the back face part of the support table 6 also has a fixed first cam plate 20 having the guide groove 19 having an inclination part in which the upper part is inwardly inclined and a vertical part extending from the lower end part in a lower direction.

Furthermore, the other side of the back face part of the support table 6 has a guide face 21 having a narrowed upper part provided at the outer periphery of the upper part and also has the second cam plate 23 having the guide groove 22 extending in the vertical direction that is slidably supported along the left and right direction of support table 6 along a guide rail (not shown).

The floating plate 10 is formed of a plate member having slide bushes 24 at the left and right end parts of the plate member. The slide bushes 24 slide along the support bar 9. A guide rail 27 is attached on the upper face of the floating plate 10. The guide rail 27 slidably supports a pair of left and right slide plates 25 and 26, respectively. Furthermore, at the left and right end side parts of the floating plate 10, a pair of left and right holding pins 29 having magnet body 28 at the lower end part are provided in a projected manner in a lower direction. When a press-contacting operation of the electric wire W, etc., as described later is carried out, the upper face of the support table 6 including a magnetic material is attracted to the magnet body 28, the floating plate 10 can be held at a lower position against the biasing force by the biasing member 14.

The slide plates 25 and 26 are respectively provided with a positioning part 30 and an electric wire holding part 31. The positioning part 30 positions the electric wire W to be opposed to the press-contacting terminal 3 adjacent to the case holding part 16 on the support table 6. The electric wire holding part 31 holds the electric wire W at the side part of the positioning part 30.

Figure 5A:
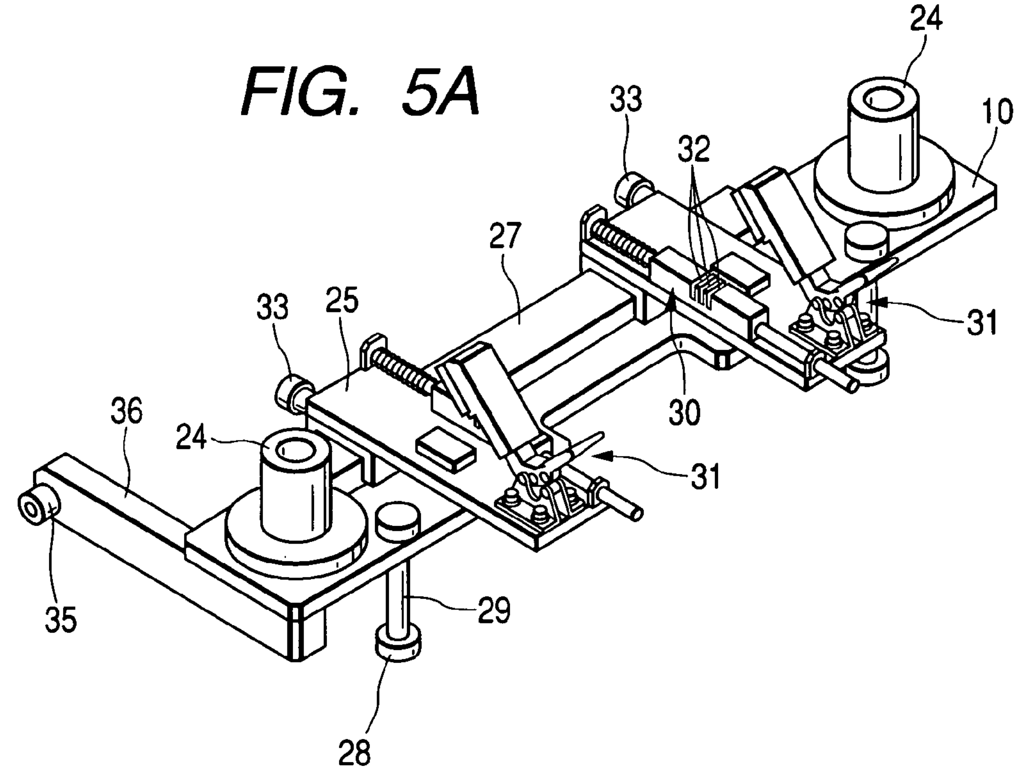
FIGS. 5A and 5B are perspective views illustrating a specific structure of the electric wire holding part.
Figure 5B:
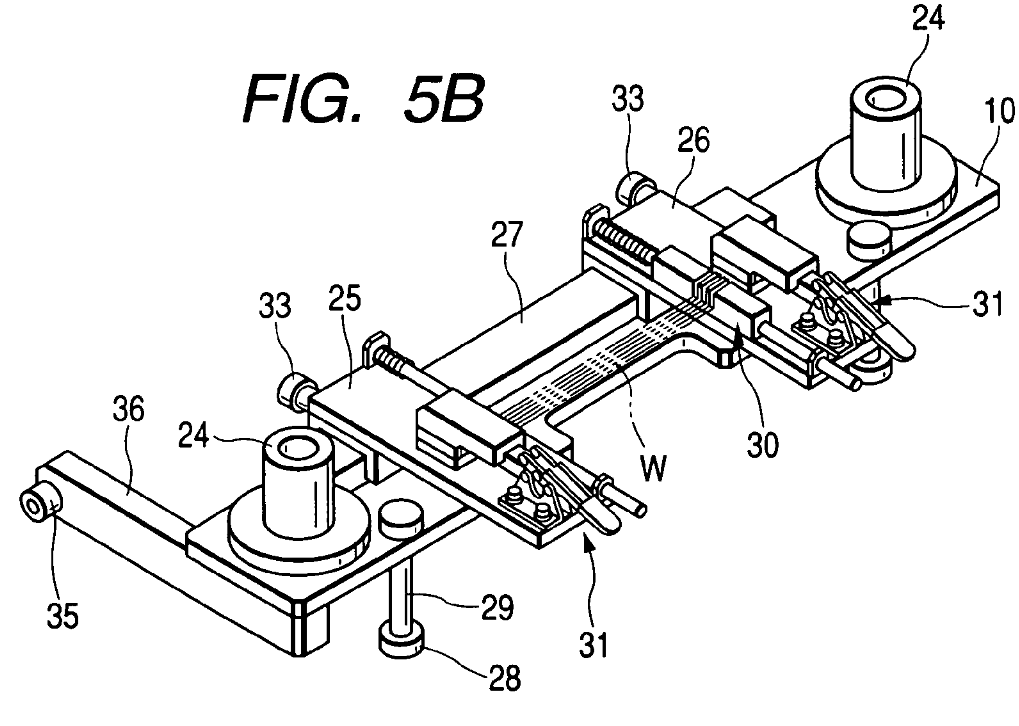

As shown in FIGS. 5A and 5B, the positioning part 30 has a block member having a plurality of concave grooves 32 to which the electric wire W is inserted. An interval between the respective press-contacting terminals 3 provided in the case 1 is set to correspond to an interval between the respective concave grooves 32.

The electric wire holding part 31 includes a clamp mechanism including a pressing plate swung and displaced between the no-clamp position shown in FIG. 5A and the clamp position shown in FIG. 5B. The electric wire W outwardly introduced from the positioning part 30 is clamped with a predetermined sandwiching force by the holding plate provided on the slide plates 25 and 26 and the press-fitting plate. Then, the pressure contact operation of the electric wire W is carried out in a state where the press-contacting terminal 3 in the case 1 held by the support table 6 and the electric wire W that is positioned by the pair of left and right positioning members 30 at both left and right end parts of the case holding part 16 to be held by the electric wire holding part 31 is opposed.

At the back face side of the both slide plates 25 and 26, the rollers 33 inserted into the guide grooves 19 and 22 of the first and second cam plates 20 and 23 are pivoted, respectively. The case 1 which is held on the support table 6 by the pair of rollers 33 rotatably pivoted by the both slide plates 25 and 26 and the first and second cam plates 20 and 23 is slide toward a press-contact stand-by position at the back side part of the base plate 8. A tension driving mechanism 34 is configured that the positioning part 30 and the electric wire holding part 31 are driven in a direction along which the electric wire W is tensioned in accordance with the sliding operation of the case 1 (see FIGS. 6A and 6B).

Figure 6A:
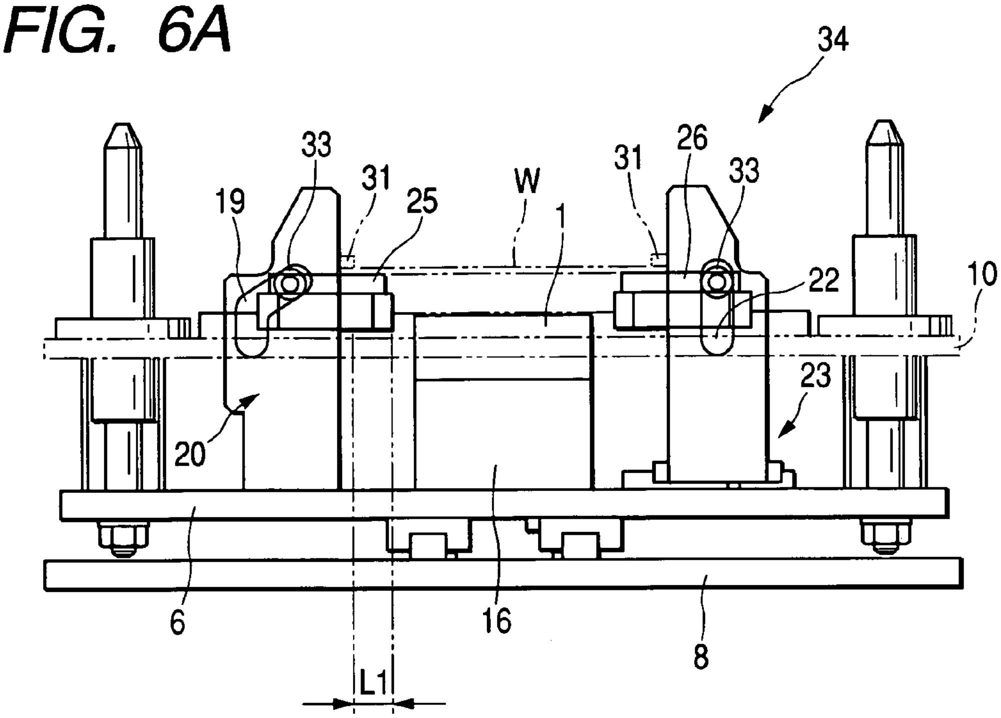
FIGS. 6A and 6B show how tension is provided to the electric wire by the tension driving mechanism.
Figure 6B:
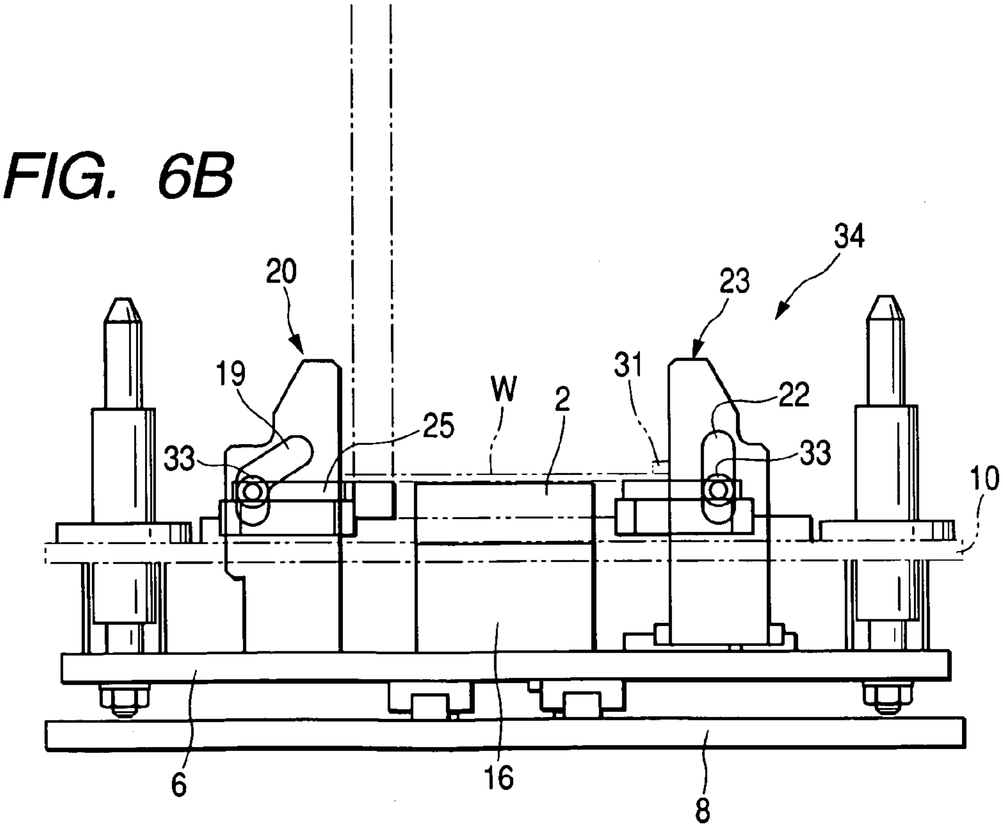

When the operation for sliding the support table 6 is carried out, the floating plate 10 is pushed down from an upper position shown in FIG. 6A to a lower position shown in FIG. 6B. In response to the pushing action, the roller 33 is slid in the lower direction while being guided along the guide groove 19 of the first cam plate 20 fixed to the support table 6 to the obliquely exterior side. Then, one slide plate 25 to which the roller 33 is pivoted is driven away from the other slide plate 26 by distance L1. Thus, both electric wire holding parts 31 on the slide plates 25 and 26 allow to have therebetween the electric wire W applied with a predetermined tension. When the roller 33 is introduced from an inclination part provided at the upper part of the guide groove 19 to the vertical part at the lower part, the driving of the slide plate 25 is stopped and thus the electric wire W is maintained to have tension.

The second cam plate 23 has the guide groove 22 extending in a vertical direction. Thus, the roller 33 does not apply a driving force for moving the slide plate 26 left and right from the roller 33 when the roller 33 pivoted by another slide plate 26 is slid along the guide groove 22. The second cam plate 23 is slidably supported on the support table 6. Thus, the slide plate 26 and the second cam plate 23 are driven in the adjacent direction of the first cam plate 23 and the slide plate 25 when the first cam plate 23 and the slide plate 25 apply a large pulling tension to the slide plate 26.

As shown in FIG. 7 to FIG. 12, the side part of the floating plate 10 is attached with the driving bar 36 having at the tip end part the guide roller 35 that is rotatably pivoted. The side face of the base plate 8 is fixed with the guide plate 38 including the guide groove 37 of the guide roller 35. The guide groove 37 includes the guide face 39 having an inclined tip end. The guide face 39 is guided, in accordance with a sliding operation for moving the support table 6 and the floating plate 10 to the pressure contact stand-by position provided at the back side part of the base plate 8, the guide roller 35 and the driving bar 36 guided in the lower direction, thereby moving the floating plate 10 from the initial position shown in FIG. 7 to the lowered position shown in FIG. 8.

Figure 9:
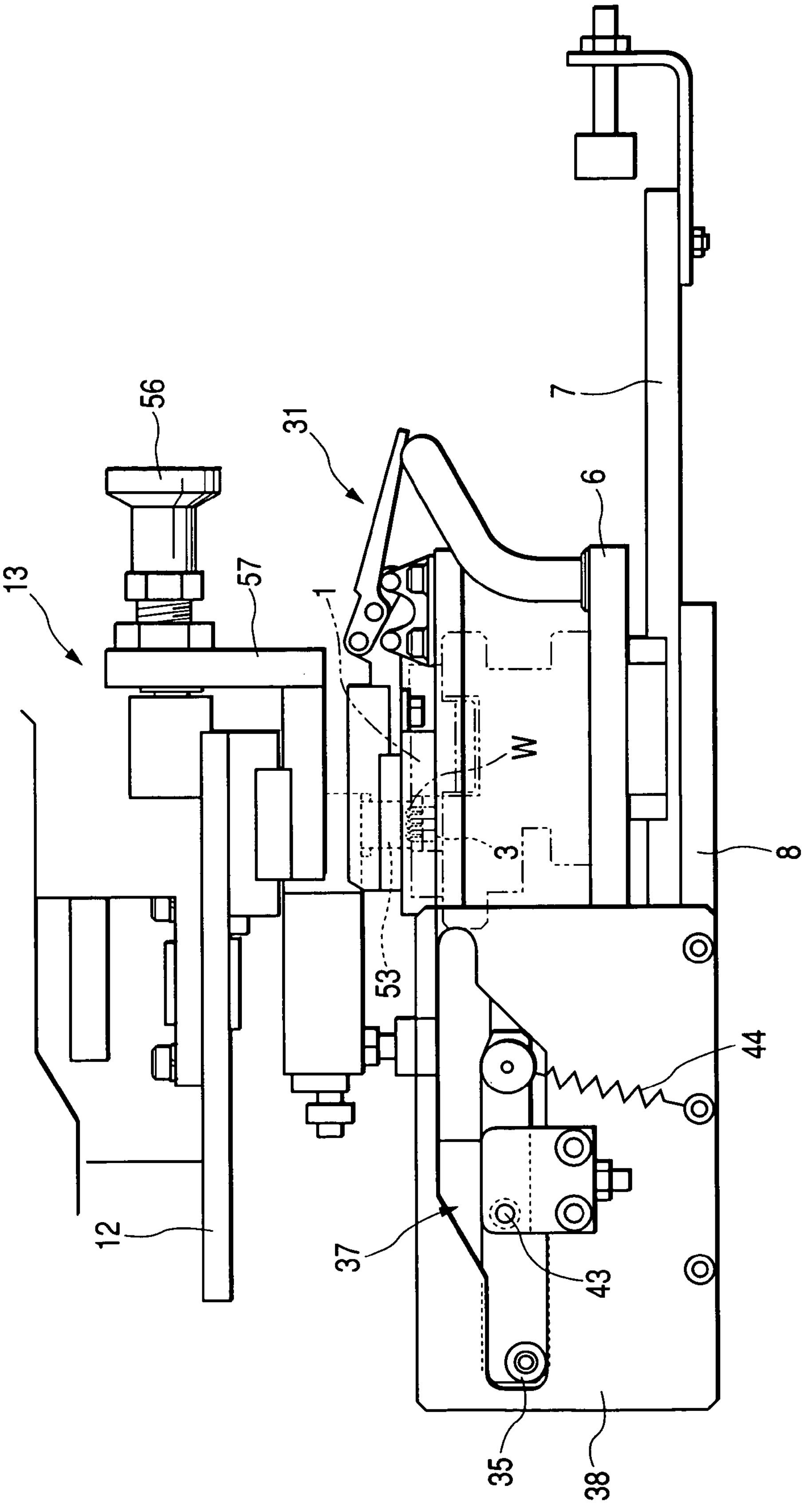
FIG. 9 shows an operation for pushing the electric wire into the press-contacting terminal.
Figure 10A:
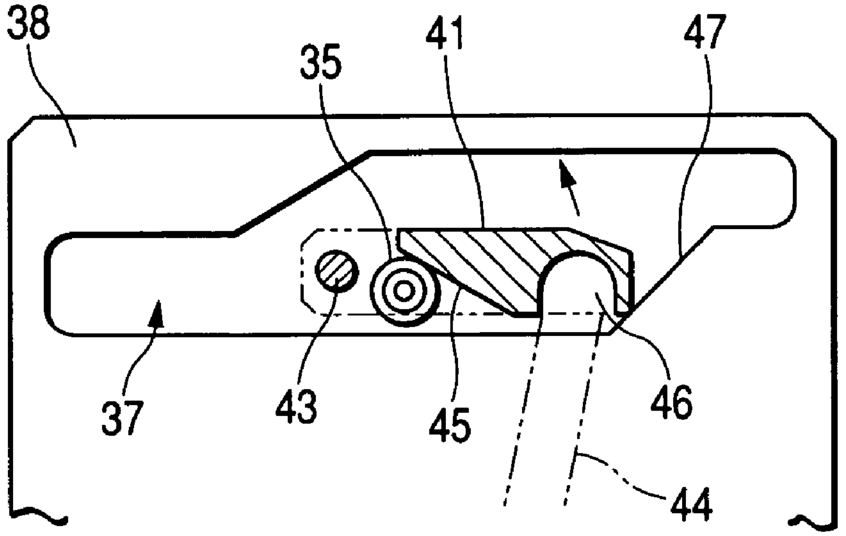
FIGS. 10A and 10B show a specific structure of the lock plate.

As shown in FIG. 9, the guide plate 38 is provided with a lock arm 41. The lock arm 41 is used to lock the floating plate 10 to the pressure contact operation position when the floating plate 110 is pushed down to the pressure contact operation position and the magnet body 29 is attracted to the support table 6 in response to a pressure contact operation as described later by the press-contacting driving mechanism 13. The lock arm 41 is swingably supported to pivot around the support shaft 43 provided on the bracket 42 and is normally supported at the lock position in the lower direction by the biasing force by the biasing member 44 having a tension coil spring, etc. As shown in FIG. 10A, the lock arm 41 has at the inner face the guide part 45 having a downwardly inclined tip end face that is provided in a projected manner. The tip end part is provided with the concave part 46 to which the guide roller 35 is fitted and locked.

Figure 10B:
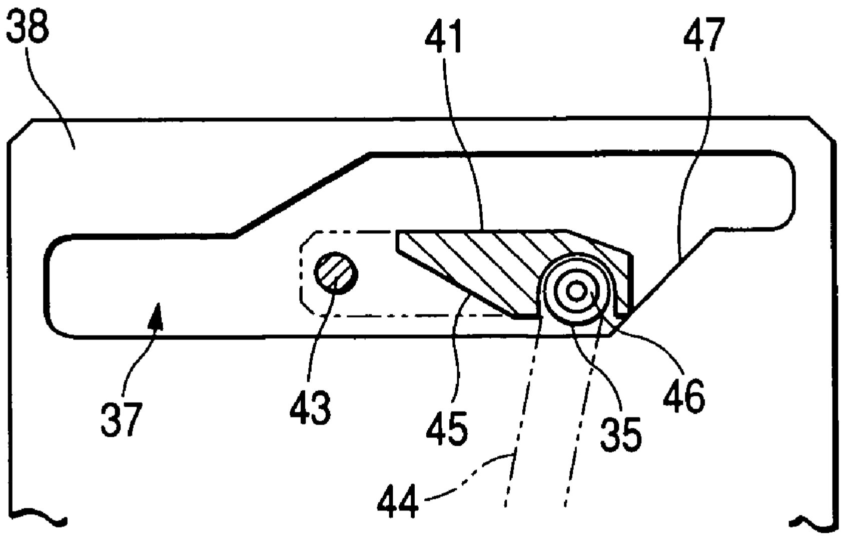
Figure 11:
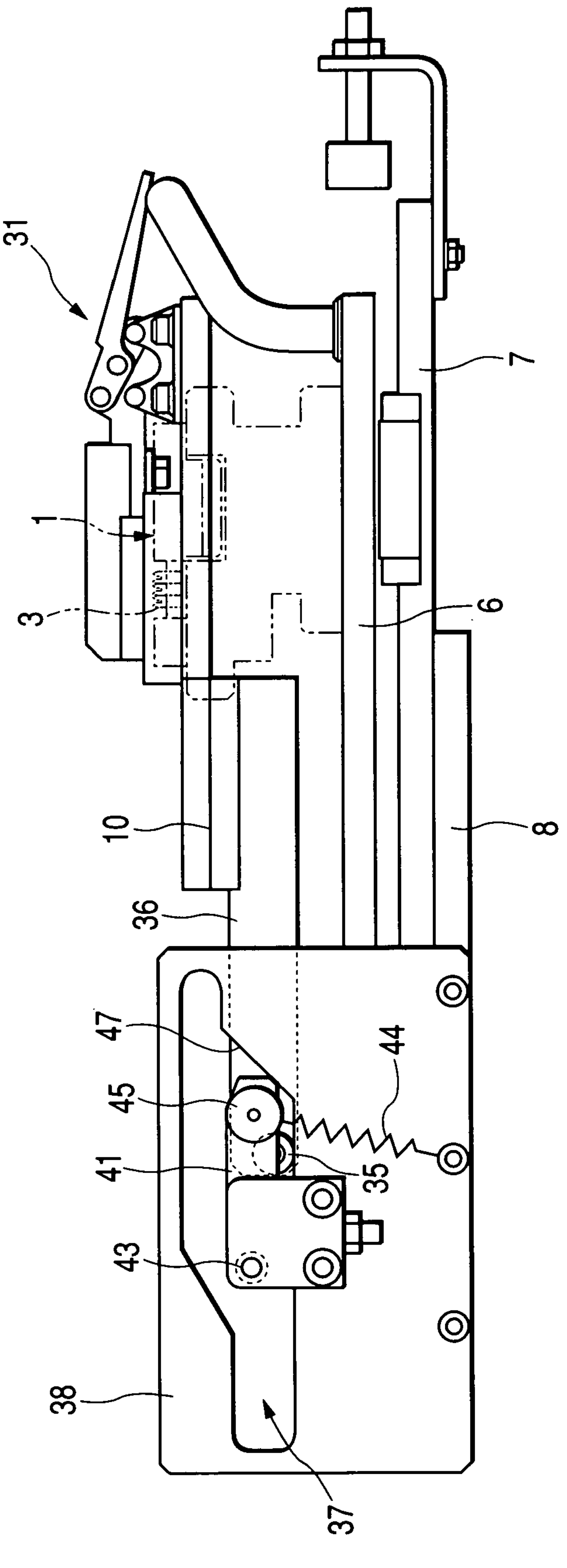
FIG. 11 shows the support table moved to a position for detaching the case.

The support table 6 is pulled in a front direction while the back side part of the press-contacting driving mechanism 13 is defined rearward and the front side part is defined forward. After the pressure contact operation by the press-contacting driving mechanism 13, In accordance with the pulled support table, the floating plate 10 are moved toward the front side together with the support table 6. Then, the guide roller 35 abuts against the guide part 45 of the lock arm 41 so that the lock arm 41 restricts the elevation of the guide roller 35 and the floating plate 10. When the support table 6 in the state is further pulled in a front direction, the lock arm 41 is elevated in a direction shown by the arrow of FIG. 10A. Thereafter, the concave part 46 of the lock arm 41 is externally engaged with the guide roller 35 as shown in FIG. 10B. As a result, front and rear movements of the support table 6 and the floating plate 10 and the elevation of the floating plate 10 are restricted by the lock arm 41. The support table 6 and the floating plate 10 are respectively held at a position for detaching the case 1 as shown in FIG. 11.

Figure 12:
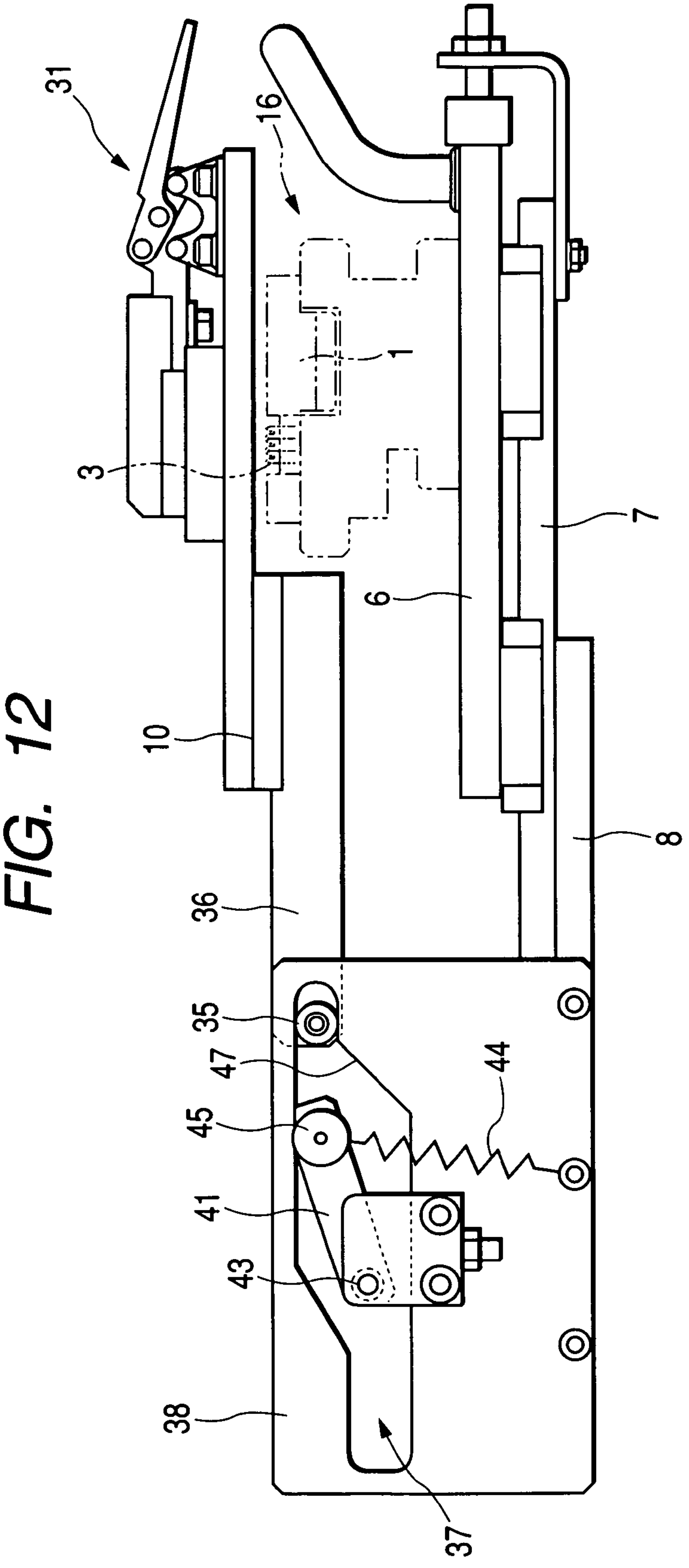
FIG. 12 shows the support table moved to the initial position.

When the state in which the support table 6 and the floating plate 10 are held is canceled, the knob 46 at the tip end part of the lock arm 41 is held to swing and displace the tip end part of lock arm 41 in an upward direction as shown in FIG. 12, thereby canceling the state in which the roller 45 is being locked by the lock arm 41. After the state in which the support table 6 is being held is canceled, the support table 6 is slid to have a displacement to the front side of the base plate 8. Then, the guide roller 35 abuts against the guide face 47 having an upwardly-inclined tip end at the guide groove 37, thus guiding the guide roller 35 and the driving bar 36 in an upward direction. In accordance with the abut guide roller, the magnet body 29 attracted to the support table 6 is separated from the support table 6 and the floating plate 10 is returned to the initial position shown in FIG. 7 in accordance with the biasing force of the biasing means 14.

As shown in FIG. 13 to FIG. 18, the head plate 50 is slidably supported along a guide rail (not shown) by the press-contacting head 12 of the press-contacting driving mechanism 13 and provided are lock blocks 51 and 52 for locking the head plate 50 to prevent the head plate 50 from having a slide displacement. At one end part side of the lower face of the head plate 50, provided are above-mentioned lower cutting blade 17 and the upper cutting blade 53 composed of the electric wire part; and the electric wire pressing part 54 having a protruded strip for pushing the electric wire W into the slot part of the press-contacting terminal 3. At the other end part side, provided is a cover holding part 55 for detachably holding the cover member 2.

Figure 13:
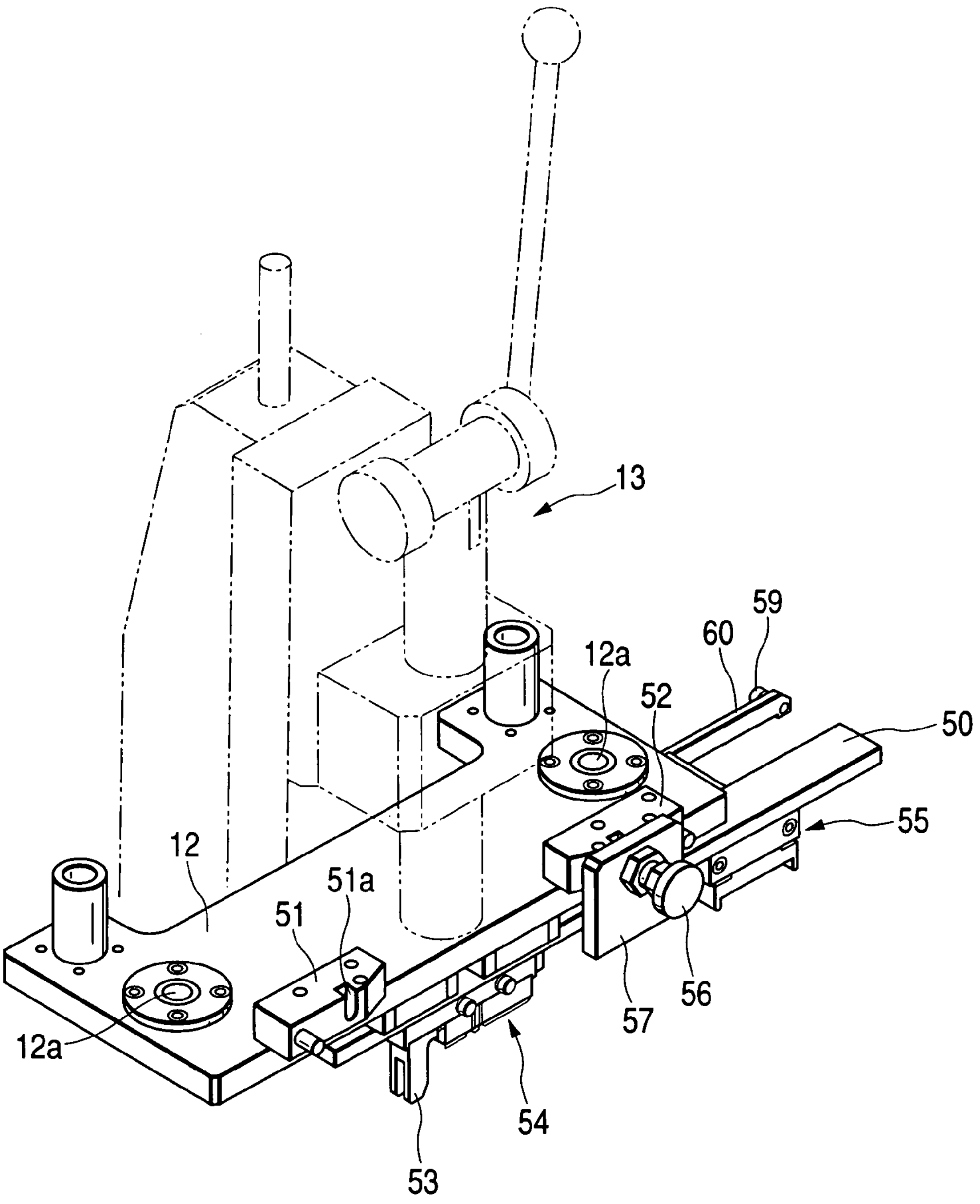
FIG. 13 is a perspective view illustrating a specific structure of the press-contacting driving mechanism.
Figure 14:
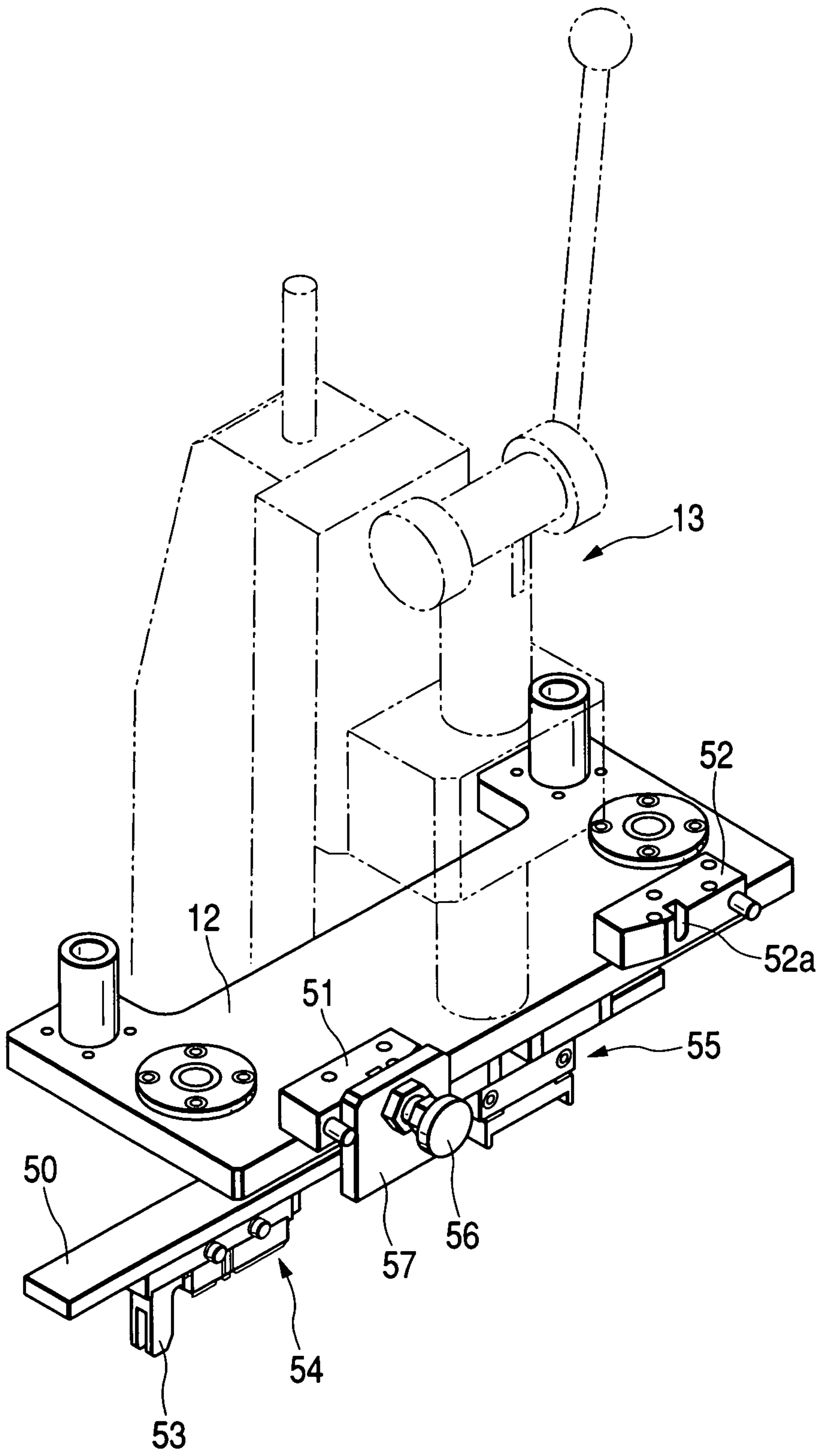
FIG. 14 is a perspective view illustrating the cover member set in the fitting stand-by position.
Figure 15:
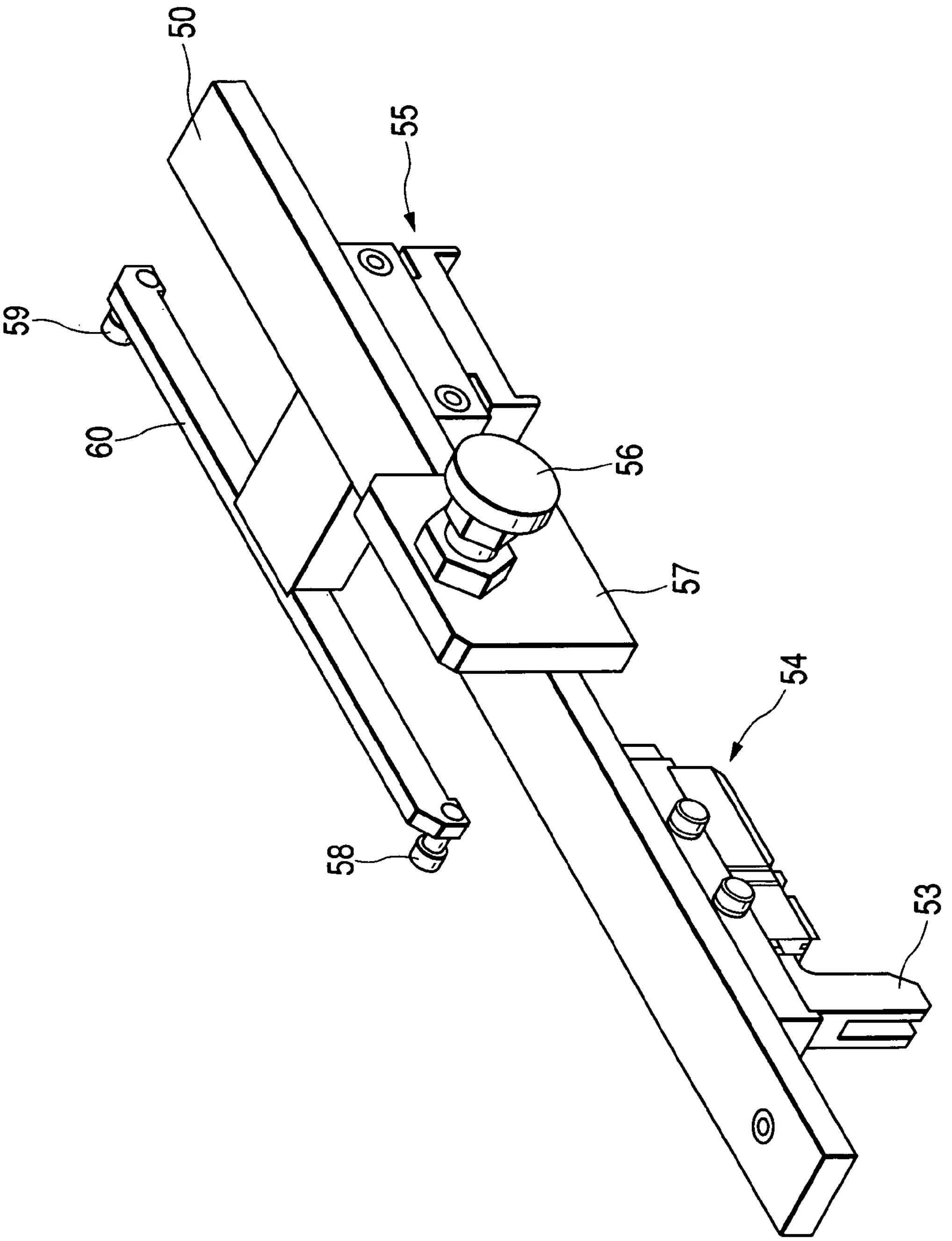
FIG. 15 is a perspective view illustrating the structure of the main part of the press-contacting driving mechanism.

Furthermore, the front face of the head plate 50 is provided with the support bracket 57 having the knob 56. The rear face is provided with the support bar 60 to which the rollers 58 and 59 are pivoted having a pressure contact with the guide faces 18 and 21 provided at the first and second cam plates 20 and 23 (see FIG. 15 and FIG. 18). Then, when the knob 56 is held so that the head plate 50 is slid to have left and right displacements along the guide rail, the electric wire pressing part 54 is moved to the pressing stand-by position of the electric wire W set at the center part of the head plate 50 as shown in FIG. 13 and the cover holding part 55 is moved to the fitting stand-by position of the cover member 2 set at the center part of the head plate 50 as shown in FIG. 14.

Figure 16B:
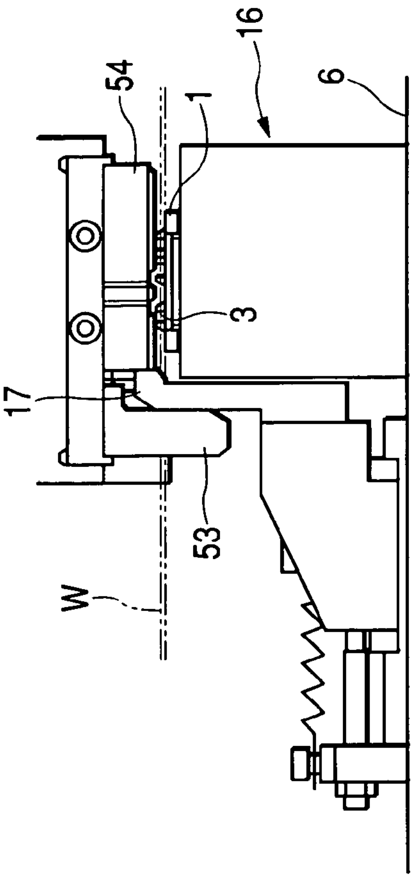
FIGS. 16A and 16B show the press-contacting of the electric wire according to the press-contacting terminal.
Figure 16A:
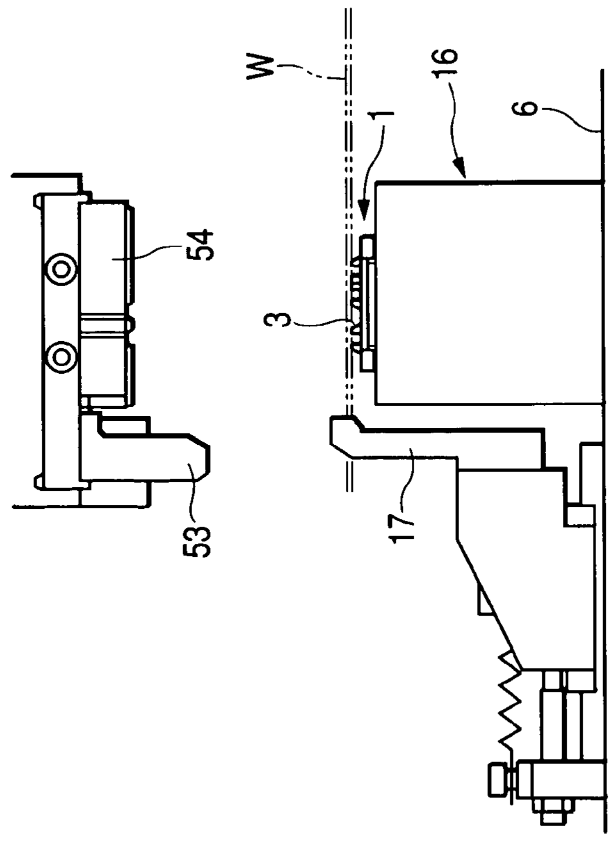

The support part racket 51 has an engagement pin (not shown) the tip end part of which appears and disappears in accordance with the push and pull operations by the knob 56. The head plate 50 is slid to have a displacement toward one end part side so that the engagement groove 51*a* provided at one lock block 51 is inserted with the engagement pin. As a result, as shown in FIG. 16A, the electric wire pressing part 54 is opposed to the holding position of the case 1 and the upper cutting blade 53 at the side part is locked while the head plate 50 is positioned at the pressing stand-by position of the electric wire W opposed to the lower cutting blade 17 provided on the support table 6.

Figure 17A:
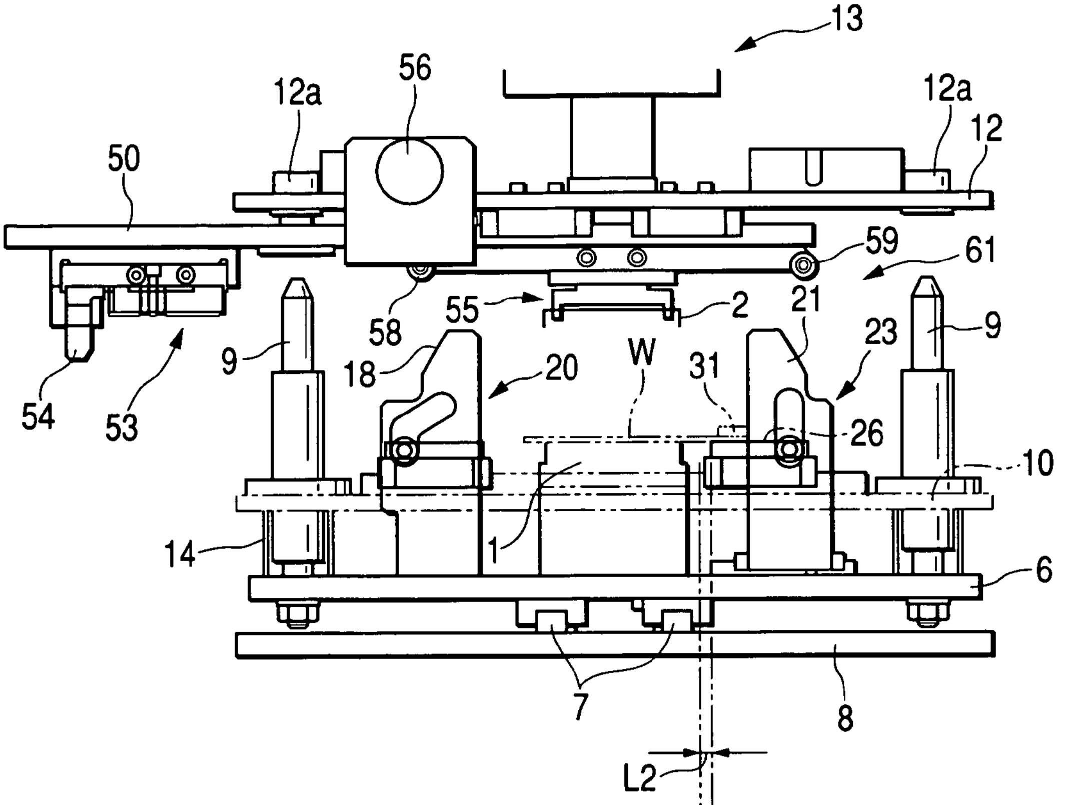
FIGS. 17A and 17B show an operation for fitting the cover member.

On the other hand, when the press-contacting driving mechanism 13 is used as an fitting driving mechanism for the cover member 2, the head plate 50 is slid to have a displacement toward the other end part side so that the engagement pin is inserted to the engagement groove 52*a* of another lock block 52. As a result, as shown in FIG. 17A, the cover holding part 55 is locked at the fitting stand-by position opposed to the holding position of the case 1 while the head plate 50 is being positioned. At the fitting stand-by position of the cover member 2, these positions are set such that the rollers 58 and 59 are opposed to the guide faces 18 and 21 of the first and second cam plates 20 and 23.

By the rollers 58 and 59 pivoted by the head plate 50 and the first and second cam plates 20 and 23, the loosening driving mechanism 61 is provided in which, in accordance with the fitting operation for engaging the cover member 2 with the case 1, one electric wire holding part 31 provided on the floating plate 10 is driven in a direction along which the electric wire W is loosened. Specifically, in accordance with the fitting operation in which the cover member 2 held by the press-contacting driving mechanism 13 at the cover holding part 55 is moved from the upper fitting stand-by position shown in FIG. 17A to the lower fitting stand-by position shown in FIG. 17B, the both rollers 58 and 59 are slid in a lower direction along the guide faces 18 and 21 of the first and second cam plates 20 and 23. In the case, the first cam plate 20 is fixed to the support table 6 and the second cam plate 23 is slidably supported along the guide rail 23*a* (see FIG. 18). Thus, the second cam plate 23 is pushed and moved by the roller 59 and the second cam plate 23 is slid toward the first cam plate 20 by the distance L2. Then, the roller 33 pivoted by the slide plate 26 is engaged with the guide groove 22 provided at the second cam plate 23. As a result, the electric wire holding part 31 on the slide plate 26 connected to the second cam plate 23 is driven in the adjacent direction to the holding position of the case 1. In response to the, the electric wire W provided between the electric wire holding part 31 and the case 1 is loosened.

Figure 18:
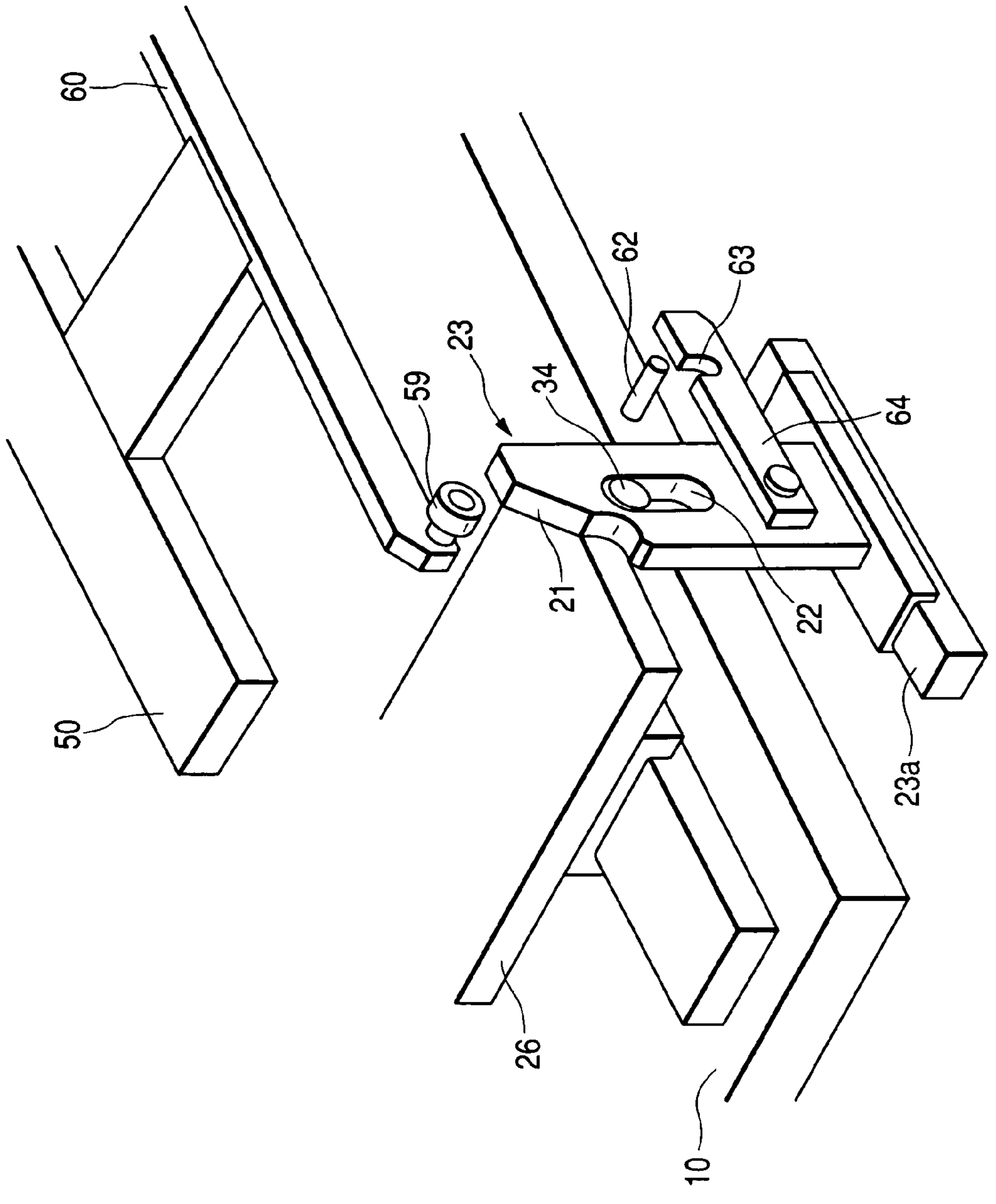
FIG. 18 is a perspective view illustrating a specific structure of the lock plate.

As shown in FIG. 18, at the back face part of the floating plate 10, the lock pin 62 is provided in a projected manner. At the back face part of the second cam plate 23, the engagement plate 64 having at the tip end part the engagement groove 63 is pivoted in an swinging manner. When the cover member 2 is fitted into the case 1, the loosening driving mechanism 61 is used to drive the second cam plate 23 to the holding position side of the case 1. In response to the, the engagement pin 62 and the engagement plate 64 are engaged and the second cam plate 23 and the slide plate 26 are locked to the loosening position of the electric wire W. Specifically, in response to the driving force by the loosening driving mechanism 61, the first cam plate 23 and the engagement plate 64 are driven in the adjacent direction to the lock pin 62 and the engagement groove 63 is moved to a position opposing the position at which the lock pin 62 is provided. Then, in response to the biasing force by a biasing means (not shown) for biasing the tip end part of the engagement plate 64 in an upward direction, the engagement groove 63 is externally engaged with the lock pin 62 to restrict the movement of the second cam plate 23. The slide plate 26 allows to be locked to the loosening position.

When the apparatus for press-contacting an electric wire having the above-mentioned structure is used to allow the press-contacting terminal 3 provided in the case 1 to pressure contact with the electric wire W, the case holding part 16 consisting of a clamp mechanism as shown in FIG. 4B is first used to position and hold the case 1 on the support table 6. As shown in FIG. 5B, while the positioning groove 32 of the positioning member 30 provided on the floating plate 10 is being inserted with the electric wire W and is being positioned, the electric wire holding part 31 consisting of a clamp mechanism provided at the side part of the positioning member 30 is used to clamp and hold the electric wire W. Thus, the electric wire W being positioned and held on the floating plate 10 is opposed to the press-contacting terminal 3 of the case 1 being positioned and held on the support table 6, and is set.

Figure 7:
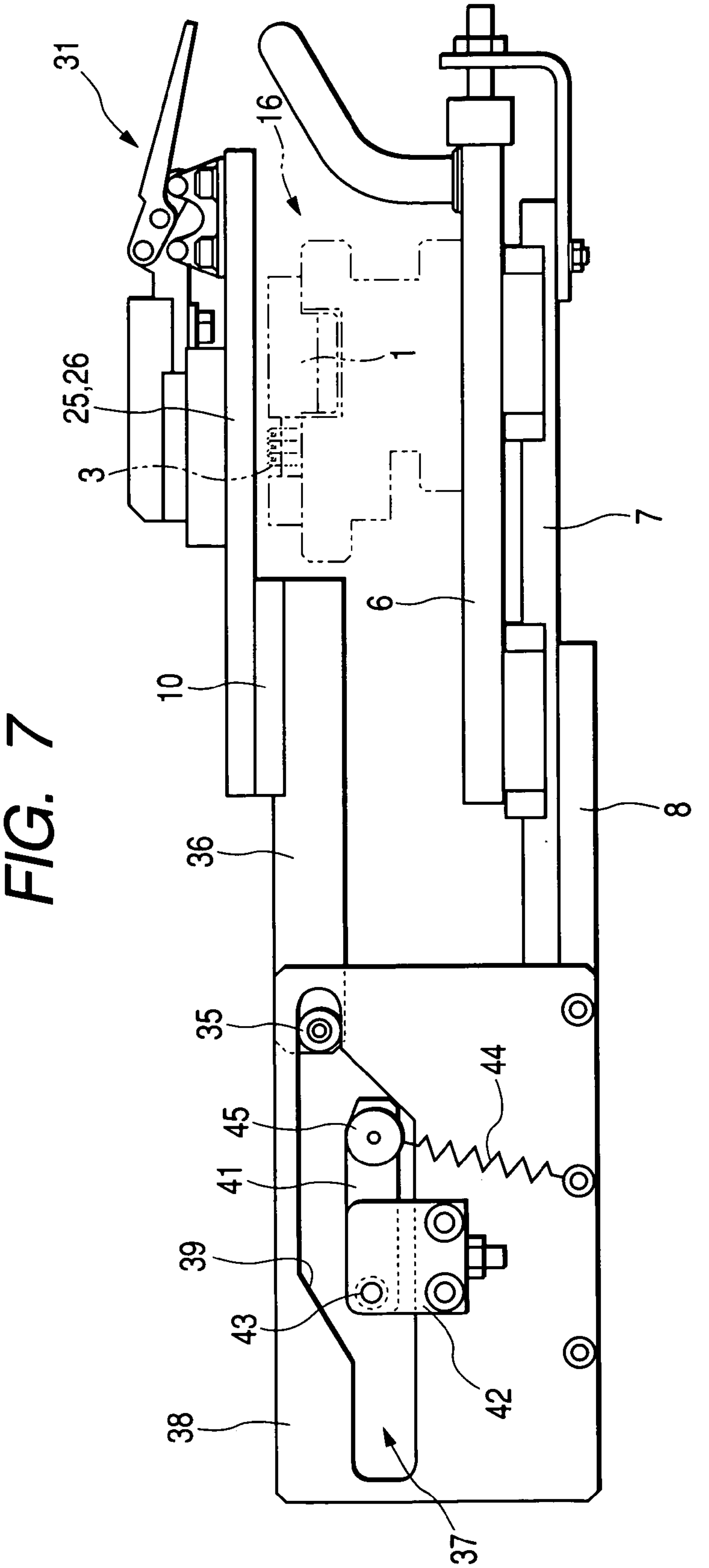
FIG. 7 shows the support table before being moved to the pressure contact stand-by position.
Figure 8:
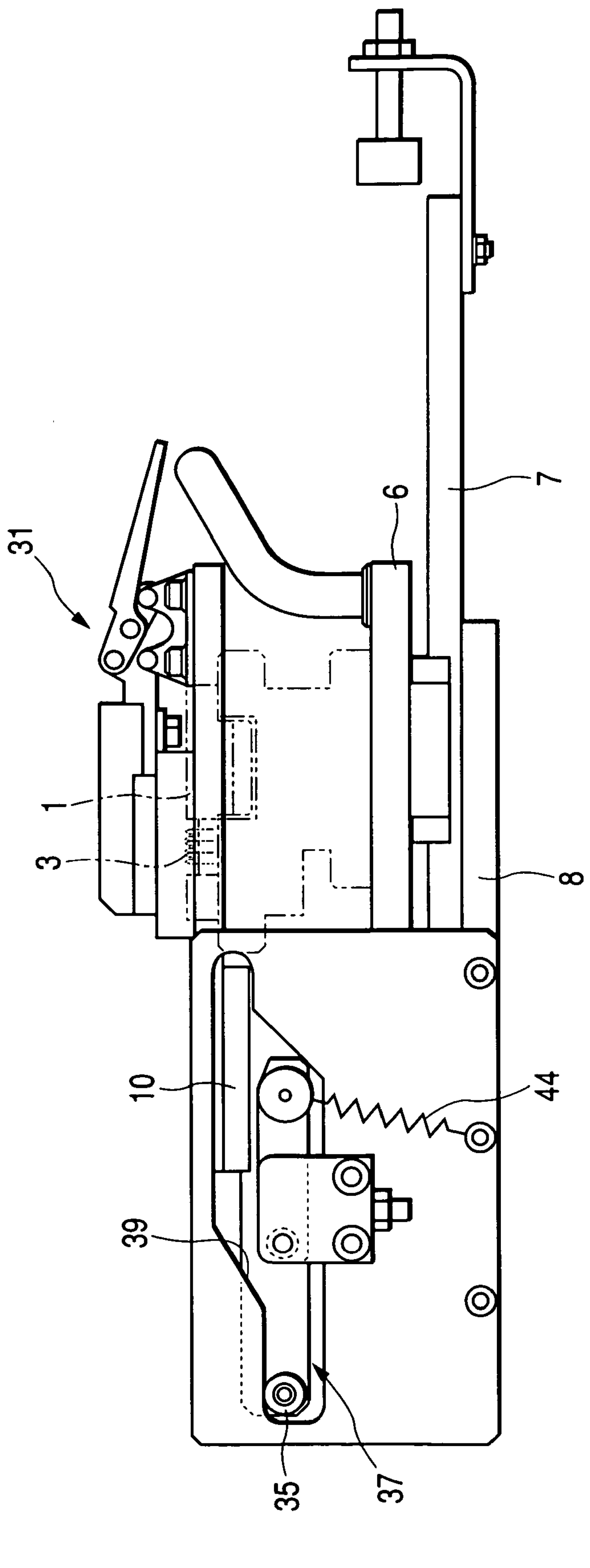
FIG. 8 shows the support table after being moved to the pressure contact stand-by position.

Next, as shown in FIG. 7, the support table 6 positioned at the front part of the base plate 8 is slid to have a displacement along the guide rail 7 to the back side part of the base plate 8. As a result, the support table 6 is moved to the pressure contact stand-by position shown in FIG. 8. In response to the slide displacement of the support table 6, the guide roller 35 provided at the tip end part of the driving bar 36 is guided along the guide groove 39 of the guide plate 38 in a lower direction. As a result, the floating plate 10 is pushed down from the initial position shown in FIG. 7 to the lowered position shown in FIG. 8.

When the floating plate 10 is pushed down, the pair of rollers 33 pivoted by the slide plates 25 and 26 are slid along the guide grooves 19 and 22 of the first and second cam plates 20 and 23 from the upper position shown in FIG. 6A to the lowered position shown in FIG. 6B, one slide plate 25 allows to be driven from the other slide table 26. As a result, the positioning part 30 and the electric wire holding part 31 provided on the slide plate 25 are driven from the positioning part 30 and the electric wire holding part 31 provided on the slide plate 26 by the distance L1. Thus, the electric wire W pressure contacts with the press-contacting terminal 3 of the case 1 while the electric wire W being held by the electric wire holding part 31 is being applied with a predetermined tension.

Thus, the support table 6 and the floating plate 10 on which the case 1 and the electric wire W are supported are moved to the pressure contact stand-by position provided at the back side part of the base plate 8 and the electric wire W is applied with a predetermined tension. Thereafter, the electric wire pressing part 54 locked to the pressing stand-by position shown in FIG. 13 is driven by the press-contacting driving mechanism 13 to be moved from the upper pressing stand-by position to the lower pressing operation position and the electric wire pressing part 54 is used to press the electric wire W in a lower direction. In response to the, the electric wire W is pushed into the slot part of the press-contacting terminal 3 to pressure contact therewith as shown in FIG. 16B and the electric wire cutting part consisting of the lower cutting blade 17 provided at the side part of the electric wire holding part 31 and the upper cutting blade 53 provided at the upper part is used to cut the electric wire W between the case 1 and the electric wire holding part 31.

Next, the press-contacting head 12 is once elevated to subsequently move and lock the cover holding part 55 provided at the base plate 50 to the application stand-by position of the cover member 2. Thereafter, the press-contacting head 12 of the press-contacting driving mechanism 13 is moved from the fitting stand-by position in an upward direction shown in FIG. 17A to the fitting operation position in a lower direction shown in FIG. 17B. The cover member 2 held by the cover holding part 55 allows to be fitted into the case 1. In the case, both rollers 58 and 59 pivoted by the head plate 50 are slid along the guide faces 18 and 21 of the first and second cam plates 20 and 23 in a lower direction. As a result, the second cam plate 23 is slid to have a displacement in the adjacent direction to the first cam plate 20 by the distance L2. In response to the, the electric wire holding part 31 on the slide plate 26 connected to the second cam plate 23 is driven toward the holding position of the case 1. Thus, the cover member 2 is fitted while the electric wire W held by the electric wire holding part 31 is being loosened.

When the electric wire pressing part 54 is used to press the electric wire W and when the cover member 2 held by the cover holding part 55 is fitted for operation, the tip end part of the support bar 9 provided in a projected manner in the support table 6 is inserted to the positioning guide 12*a* provided at the press-contacting head 12. The support table 6 allows to be positioned with the press-contacting head 12 in a horizontal direction. As a result, the electric wire W can be pressed and the cover member 2 can be fitted to be operated while the case 1 held by the support table 6 and the electric wire pressing part 54 and the cover holding part 55 provided at the head plate 50 are being precisely positioned (see FIG. 17B.)

After the cover member 2 is fitted for operation into the case 1, the support table 6 and the floating plate 10 are moved to a position shown in FIG. 11 for detaching the case 1. Then, the case 1 is detached. Thereafter, as shown in FIG. 12, the state in which the floating plate 10 is held by the lock arm 41 is canceled and the floating plate 10 is pulled, the floating plate 10 allows to return to the initial position shown in FIG. 7. Then, operation preparation proceeds to the press-contacting where a new case 1 is held on the support table 6 and the electric wire W is positioned on the floating plate 10 and being held is carried out.

As described above, the present invention includes: a case holding part 16 for holding a case 1 in which a press-contacting terminal 3 is stored; a positioning part 30 for positioning the electric wire W in the vicinity of the case holding part 16 to be opposed to the press-contacting terminal 3; an electric wire holding part 31 for holding the electric wire W positioned by the positioning part 30; a press-contacting driving mechanism 13 for driving the electric wire W held by the electric wire holding part 31 so that the electric wire W is pushed into the slot part of the press-contacting terminal 3 to provide pressure contact therebetween; and a tension driving mechanism 34 for driving the electric wire holding part 31 in a direction along which the electric wire W held by the electric wire holding part 31 is tensioned. As a result, without using the group of sandwiching pieces or the like as shown in JP-A-2002-93544 for temporarily holding the positioned electric wire in the case, the press-contacting terminal 3 can be pushed into the slot part to pressure contact in an easy and appropriate manner while the electric wire W between a pair of left and right electric wire holding parts 31 provided in the vicinity of the case holding part 16 is being applied with appropriate tension and while the electric wire W is being precisely positioned.

Specifically, when the electric wire W positioned by the positioning part 30 at the side of the case 1 is held by the electric wire holding part 31, the tension driving mechanism 34 can be used to drive the electric wire holding part 31 to provide the electric wire W with tension, even when the electric wire W has some looseness. Thus, the looseness of the electric wire W can be eliminated and the press-contacting driving mechanism 13 can be used to provide pressure contact with the electric wire W while the electric wire W is elongated in a straight manner. As a result, an advantage is provided in which the electric wire W can be provided with pressure contact in an easy and appropriate manner regardless of the structure of the press-contacting terminal storage part and without causing an adverse effect such as looseness of the electric wire W prevents the electric wire W from being precisely pushed into the slot part of the press-contacting terminal 3, for example.

The above-mentioned embodiment provides the electric wire cutting part consisting of a pair of lower cutting blade 17 and upper cutting blade 53. The electric wire cutting part is operated, in response to the press-contacting operation of the electric wire W by the press-contacting driving mechanism 13, to cut the electric wire W between the case 1 held by the case holding part 16 and the electric wire holding part 31. As a result, a press-contacting operation for providing press-contacting with the press-contacting terminal 3 and an operation for cutting an unnecessary electric wire W can be continuously carried out in a single step. Moreover, the lower cutting blade 17 and upper cutting blade 53 cut the electric wire W while the electric wire W between the left and right electric wire holding parts 31 provided in the vicinity of the case holding part 16 is being applied with appropriate tension. The provides an advantage in which the electric wire W can be cut in a straight manner and an adverse effect can be effectively prevented such as one in which the cut ends of the opposing adjacent electric wires W have deformation in a direction along which they contact.

As described above, the electric wire pressure contact apparatus is used to push the electric wire W into the slot part of the press-contacting terminal 3 to provide pressure contact therebetween while the press-contacting terminal 2 provided in the case 1 is being positioned with the electric wire W held by the electric wire holding part 31. The electric wire pressure contact apparatus includes: the cover holding part 55 for holding the cover member 2 to be fitted into the case 1; the fitting driving mechanism consisting of the press-contacting driving mechanism 13 for driving the cover member 2 held by the cover holding part 55 to be fitted into the case 1; and the loosening driving mechanism 61 for driving, in response to the fitting of the cover member 2, the electric wire holding part 31 in a direction along which the electric wire W is loosened. As a result, the cover member 2 can be fitted into the case 1 without causing an adverse effect such as the one in which, when the cover member 2 is fitted, the cover member 2 has a strong pressure contact with the electric wire W to cause the electric wire W to have a significant load or the electric wire W is pulled out of the press-contacting terminal 3.

Figure 17B:
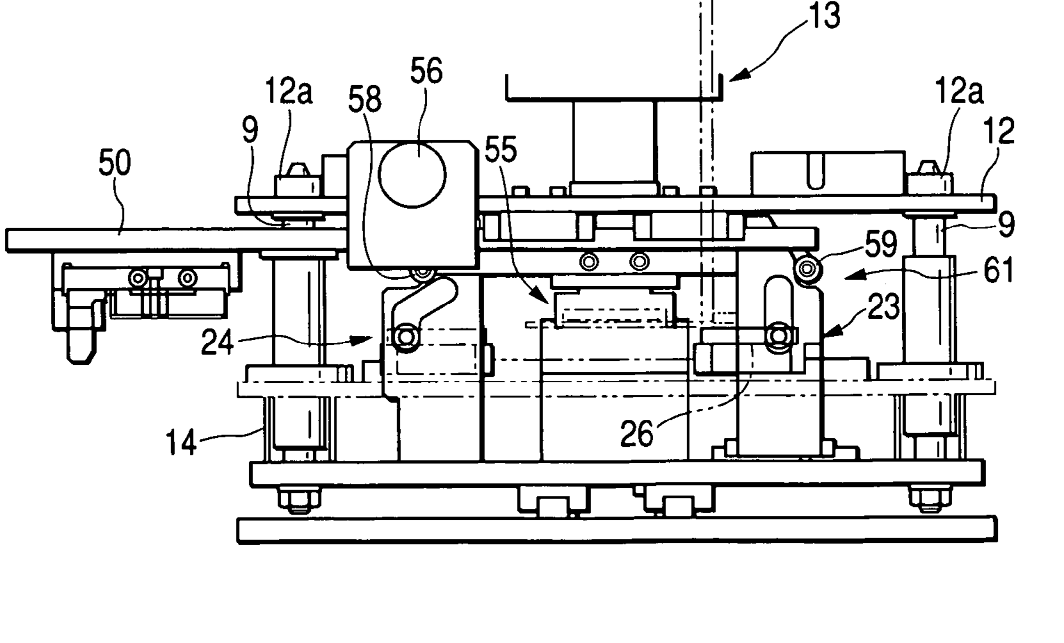
Figure 19A:
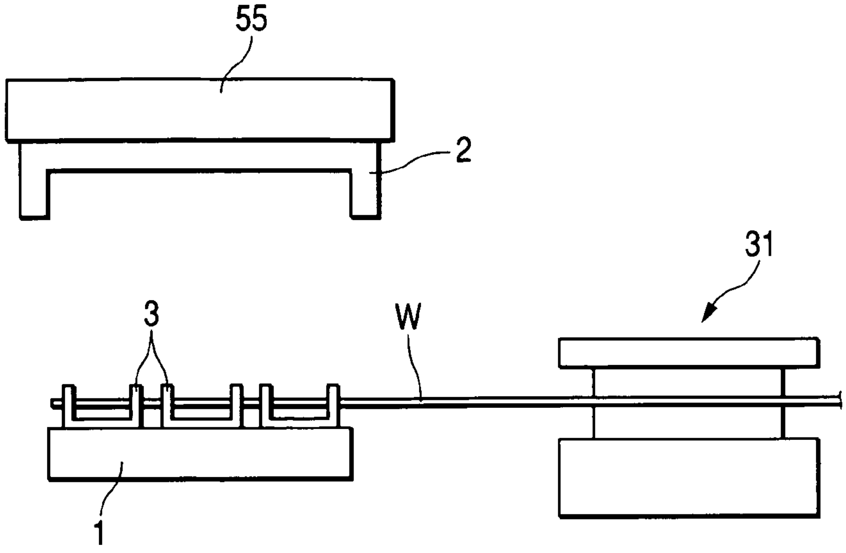
FIGS. 19A to 19C show an operation for engaging the cover member.
Figure 19B:
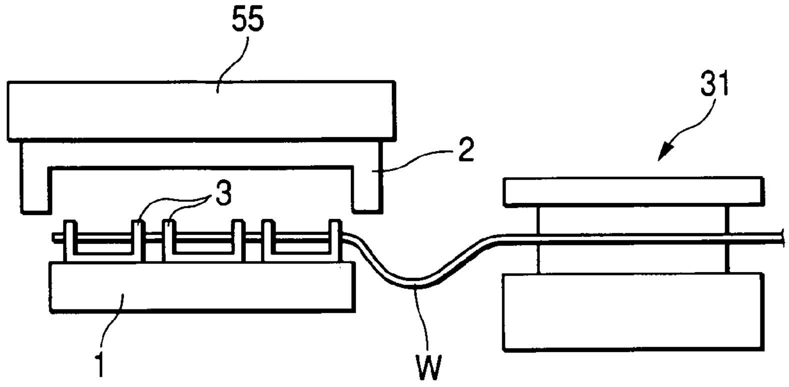
Figure 19C:
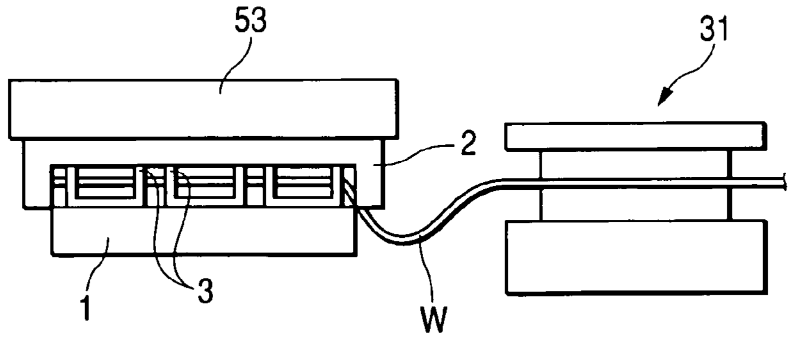

Specifically, when a fitting operation is carried out in which the cover member 2 held by the cover holding part 55 of the press-contacting driving mechanism 13 is moved from the fitting stand-by position in an upward direction shown in FIG. 17A to the fitting operation position shown in FIG. 17B, the electric wire holding part 31 is moved to the holding part side of the case 1 as shown in FIGS. 19A to 19C. The electric wire W between the case 1 and the electric wire holding part 31 allows to have looseness. The can effectively prevent a situation in which the cover member 2 is strongly pushed to the electric wire W having tension to cause a significant load to the electric wire W. The cover member 2 allows to be fitted into the case 1 in an easy and appropriate manner.

In the above-mentioned embodiment, the head plate 50 of the press-contacting driving mechanism 13 for pushing the electric wire W into the slot part of the press-contacting terminal 3 to provide pressure contact therebetween includes the cover holding part 55 so that the press-contacting driving mechanism 13 can be used as fitting driving mechanism of the cover member 2. The provides an advantage in which an operation for providing the electric wire W with pressure contact with the press-contacting terminal 3 and an operation for engaging the cover member 2 with the case 1 can be respectively carried out with a simple and compact structure.

In particular, as shown in the above-mentioned embodiment, the first and second cam plates 20 and 23 include the guide grooves 19 and 22 that provides the tension driving mechanism 34 together with the roller 33 pivoted by the slide plates 25 and 26; and the guide faces 18 and 21 that provide the loosening driving mechanism 61 together with the rollers 58 and 59 pivoted by the head plate 50, respectively so that these first and second cam plates 20 and 23 can be commonly used as the components of the tension driving mechanism 34 and the loosening driving mechanism 61. The allows the tension operation and the loosening operation of the electric wire W to be respectively carried out with a simple structure.

Furthermore, the above-mentioned embodiment was structured such that, the floating plate 10 is lowered in response to the pressure contact operation by the press-contacting driving mechanism 13 so that the magnet body 28 provided at the lower end part of the holding pin 29 is attracted to the support table 6 and the floating plate 10 is held at the lowered position and the lock arm 41 is used to restrict the elevation of the floating plate 10 to hold the floating plate 10 at a position for detaching the case 1 shown in FIG. 11 when the support table 6 and the floating plate 10 are pulled out. The provides an advantage in which, an inconvenience can be effectively prevented in which, when the case 1 is detached, the floating plate 10 is pushed up by the biasing force by the biasing means 14 to prevent the case 1 from being detached.

The above-mentioned embodiment described an example in which the first cam plate 20 for providing the tension driving mechanism 34 and the loosening driving mechanism 61 is fixed to the support table 6 and the second cam plate 23 is slidably supported along the support table 6. However, another structure also may be used in which the first and second cam plates 20 and 23 are slidably supported, respectively, and a guide groove extending in a vertical direction with the second cam plate 23 is provided in the second cam plate 23. Such a structure allows, when the tension driving mechanism 34, is used to provide tension with the electric wire W for example, the first and second cam plates 20 and 23 to slide and move away from each other so that the electric wire holding parts 31 on the slide plates 25 and 26 are driven to move away from each other. The electric wire W allows to be with a predetermined tension.

The present invention includes: a case holding part for holding a case in which a press-contacting terminal is stored; a positioning part for positioning the electric wire in the vicinity of the case holding part to be opposed to the press-contacting terminal; an electric wire holding part for holding the electric wire positioned by the positioning part; a press-contacting driving mechanism for driving the electric wire held by the electric wire holding part so that the electric wire is pushed into the slot part of the press-contacting terminal to provide pressure contact therebetween; and a tension driving mechanism for driving the electric wire holding part in a direction along which the electric wire held by the electric wire holding part is tensioned. As a result, an advantage is provided in which the electric wire can be pushed into the slot part of the press-contacting terminal to provide pressure contact therebetween in an easy and appropriate manner while the electric wire between electric wire holding parts in the vicinity of the case holding part is being applied with appropriate tension and while the electric wire is being precisely positioned without using the group of sandwiching pieces or the like for temporarily holding the positioned electric wire in the case.

According to the present invention, the apparatus for press-contacting an electric wire, while the press-contacting terminal stored in the case is being positioned with the electric wire is held by the electric wire holding part, the electric wire is pushed into the slot part of the press-contacting terminal to provide pressure contact therebetween, wherein, a cover holding part for holding a cover member that is fitted to cover the position at which the electric wire is provided in the case; a fitting driving mechanism for driving the cover member held by the cover holding part so that the cover member is fitted into the case; and a loosening driving mechanism for driving, in response to the operation for fitting the cover member, the electric wire holding part in a direction along which the electric wire is loosened. As a result, the cover member held by the cover holding part can be fitted into the case while the electric wire held by the electric wire holding part is being loosened. Thus, an adverse effect can be effectively prevented such as the one in which a strong pressure contact between the cover member and the electric wire causes a significant load to the electric wire or the electric wire is pulled out from the press-contacting terminal.

What is claimed is:

1. An apparatus for press-contacting an electric wire, comprising:

a case holding part for holding a case in which a press-contacting terminal is stored;

a positioning part for positioning the electric wire in the vicinity of the case holding part to be opposed to the press-contacting terminal;

an electric wire holding part for holding the electric wire positioned by the positioning part;

a press-contacting driving mechanism for driving the electric wire held by the electric wire holding part so that the electric wire is pushed into a slot part of the press-contacting terminal to provide pressure contact therebetween;

a tension driving mechanism for driving the electric wire holding part in a direction along which the electric wire held by the electric wire holding part is tensioned;

a cover holding part for holding a cover member that is fitted for covering a position at which the electric wire is held in the case;

a fitting driving mechanism for driving the cover member held by the cover holding part so that the cover member is fitted into the case; and a loosening driving mechanism for driving, in response to the operation for fitting the cover member, the electric wire holding part in a direction along which the electric wire is loosened.

2. An apparatus for press-contacting an electric wire, comprising:

a case holding part for holding a case in which a press-contacting terminal is stored;

a positioning part for positioning the electric wire in the vicinity of the case holding part to be opposed to the press-contacting terminal;

an electric wire holding part for holding the electric wire positioned by the positioning part;

a press-contacting driving mechanism for driving the electric wire held by the electric wire holding part so that the electric wire is pushed into a slot part of the press-contacting terminal to provide pressure contact therebetween;.

a tension driving mechanism for driving the electric wire holding part in a direction along which the electric wire held by the electric wire holding part is tensioned;

an electric wire cutting part for cutting the electric wire between the case holding part and the electric wire holding part in response to the press-contacting operation by the press-contacting driving mechanism;

a cover holding part for holding a cover member that is fitted for covering a position at which the electric wire is held in the case;

a fitting driving mechanism for driving the cover member held by the cover holding part so that the cover member is fitted into the case; and a loosening driving mechanism for driving, in response to the operation for fitting the cover member, the electric wire holding part in a direction along which the electric wire is loosened.

* * * * *